United States Patent [19]

Harris et al.

[11] Patent Number: 5,373,043

[45] Date of Patent: * Dec. 13, 1994

[54] PARTICULATE POLYMERS AND STABILIZER COMPOUNDS AND POLYMER COMPOSITIONS PREPARED THEREFROM

[75] Inventors: Robert F. Harris, Midland; Michael R. Savina, Ann Arbor; Michael D. Joseph, Midland, all of Mich.

[73] Assignee: The Dow Chemical Company, Midland, Mich.

[ * ] Notice: The portion of the term of this patent subsequent to Feb. 19, 2008 has been disclaimed.

[21] Appl. No.: 109,755

[22] Filed: Aug. 19, 1993

Related U.S. Application Data

[63] Continuation-in-part of Ser. No. 406,944, Sep. 13, 1989, Pat. No. 4,994,503.

[51] Int. Cl.$^5$ .............................................. C08G 67/00
[52] U.S. Cl. ................................. 524/377; 525/459; 528/76; 528/80; 528/83; 528/332
[58] Field of Search ............... 524/377, 762; 525/459; 528/76, 80, 83, 332, 336, 390; 521/137

[56] References Cited

U.S. PATENT DOCUMENTS

| | | | |
|---|---|---|---|
| 4,089,835 | 5/1978 | Konig et al. | 525/83 |
| 4,374,209 | 2/1983 | Rowlands | 525/78 |
| 4,477,602 | 10/1984 | Liang et al. | 528/76 |
| 4,546,121 | 10/1985 | Haas et al. | 528/76 |
| 4,701,475 | 10/1987 | Turner | 528/76 |
| 4,994,503 | 2/1991 | Harris et al. | 528/76 |

*Primary Examiner*—Maurice J. Welsh

[57] ABSTRACT

This invention relates to a solid particulate polymer comprising 1) a backbone containing (a) a plurality of moieties selected from the group consisting of alkylene, arylene, aralkylene, alkylarylene, cycloalkylene, alkyleneoxy, and polyalkyleneoxy; (b) a plurality of moieties selected from the group consisting of internal urea, thiourea, biuret and dithiobiuret; and 2) end groups selected from the group consisting of internal urea, thiourea, biuret and dithiobiuret. The particulate polymer dispersions can be used for preparing reinforced polymer matrices, especially where the matrix comprises urethane and/or urea linkages.

The invention allows for the preparation of a particulate polymer without using organic polyisocyanate.

24 Claims, No Drawings

PARTICULATE POLYMERS AND STABILIZER COMPOUNDS AND POLYMER COMPOSITIONS PREPARED THEREFROM

CROSS-REFERENCE TO RELATED APPLICATION

This application is a continuation-in-part of copending patent application Ser. No. PCT/US91/01087, filed Feb. 19, 1991, which is a continuation-in-part of Ser. No. 406,944, filed Sep. 13, 1989, which is now U.S. Pat. No. 4,994,503.

FIELD OF THE INVENTION

This invention relates to particulate polymers, stabilizer compounds and compositions prepared therefrom. A process for preparing the particulate polymer and its use in forming compositions, especially stable dispersions suitable for incorporating into other polymer matrices, particularly those comprising urethane and/or urea linkages, such as flexible foams, is disclosed.

BACKGROUND OF THE INVENTION

Polyurethane polymers, especially foams, with improved mechanical properties (particularly tensile strength and hardness) can be prepared by reacting an organic polyisocyanate with an isocyanate-reactive composition where at least one component comprises a stable dispersion.

Typically the dispersion consists of a polyurea or polyhydrazo-dicarbonamide which is prepared by reacting a diisocyanate with difunctional primary or secondary amines, hydrazines or hydrazides in polypropylene glycol ethers. Such processes are described in the literature in, for example, U.S. Pat. Nos. 3,325,421 and 4,089,835, German Patent DE 2,513,815 and are extensively reviewed by K. G. Spitler and J. J. Lindsey, *Journal of Cellular Plastics*, Vol. 17, p. 43 (1981). Complementary to these dispersions are those polyisocyanate-derived polyurea dispersions in aromatic polyisocyanates such as disclosed by patent GB 2,127,031.

To date, all polyurea dispersions in either polyether polyols or organic polyisocyanates involve the handling of organic polyisocyanates in the preparation of the particulate matter of such dispersions. Polyisocyanates are relatively expensive starting materials and also toxic compounds which have to be handled with care.

Accordingly, it would be desirable to provide a process for the preparation of a stable polyurea dispersion which does not involve the use of an organic polyisocyanate. By stable, it is understood that the dispersion can be stored for an extended period, at least 2 weeks, preferably at least one month and up to 6 months, and subjected to normal fluctuations of room temperature without the dispersed particulate polymer agglomerating or solidifying to any significant degree, thus preventing its further use. Some sedimentation of the particulate solid may take place during storage, but this can readily be redispersed on agitation.

It is known that polyhydroxyalkyl monoureas can be synthesized by reacting urea with a polyhydroxylamine as already described in, for example, U.S. Pat. Nos. 3,560,564 and 4,546,121, German Patent 1,463,398, German Offenlegungsschrift 2,703,185 and British Patent 1,127,605. Such prepared monoureas, especially trishydroxyalkyl monoureas, are frequently liquids and form stable liquid dispersions in polyols at room temperature. These dispersions find value as reactive flame-proofing recompounds in polyurethane foams.

It is therefore an objective of this invention to develop a discrete particulate polymer and polyahl compositions therewith for improving the mechanical properties of polymer matrices, especially those comprising urethane and/or urea linkages such as flexible foams. A further objective is to provide a process for the preparation of such a discrete particulate polymer which does not require the use of an organic polyisocyanate.

SUMMARY OF THE INVENTION

In one aspect, this invention is a solid particulate polymer comprising
1. a backbone containing
   (a) a plurality of moieties selected from the group consisting of alkylene, arylene, aralkylene, alkylarylene, cycloalkylene, alkyleneoxy, and polyalkyleneoxy;
   (b) a plurality of moieties selected from the group consisting of internal urea, thiourea, biuret and dithiobiuret; and
2. end groups selected from the group consisting of terminal urea, thiourea, biuret and dithiobiuret.

In a second aspect, this invention is a polymeric stabilizer compound containing a plurality of aminocarbonyl and/or aminothiocarbonyl moieties which is the reaction product of
   (a) a partially aminated poly(alkylene glycol) and/or an aminated monoalkylene glycol;
   (b) one or more carbonyl- or thiocarbonyl-containing compounds selected from the group consisting of a urea compound, a biuret compound, a thiourea compound and a dithiobiuret compound; and
   (c) one or more polyamines, at an elevated temperature sufficient to cause the reaction between (a), (b), and (c) to form the stabilizer compound.

In a third aspect, this invention is a urethane/urea polymer, such as a flexible polyurethane foamy characterized in that the polymer was prepared in the presence of a stable dispersion of (b) in (a) which comprises
   (a) a continuous phase; and
   (b) from about 0.1 to about 50 weight percent by total weight of (a) and (b) of a discrete particulate polymer which has an average particle size of about 30 microns or less, characterized in that (b) is a product containing a plurality of moieties selected from the group consisting of internal urea, thiourea, biuret and dithiobiuret, which is the result of a reaction that comprises contacting
   (c) one or more carbonyl- or thiocarbonyl-containing compounds selected from the group consisting of urea compounds, biuret compounds, thiourea compounds, or dithiobiuret compounds; and
   (d) one or more polyamines.

In a fourth aspect, this invention is a stable dispersion of (b) in (a) which comprises
   (a) a continuous phase; and
   (b) from about 0.1 to about 50 weight percent by total weight of (a) and (b) of a discrete particulate polymer which has an average particle size of about 30 microns or less, characterized in that (b) is a product containing a plurality of aminocarbonyl moieties or aminothiocarbonyl moieties which is the result of a reaction that comprises contacting
   (c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and (d) one or more polyamines.

In a fifth aspect, this invention is a process for preparing a particulate polymer containing a plurality of aminocarbonyl moieties or aminothiocarbonyl moieties that comprises contacting (c) one or more carbonyl- or thiocarbonyl-containing compounds selected from the group consisting of a urea compound, a biuret compound, a polycarboxylic acid compound or its ester or anhydride, a polycarboxylic acid chloride, a thiourea compound, a dithiobiuret compound, a polythiocarboxylic acid or its ester or anhydride, and a polythiocarboxylic acid chloride; and (d) one or more polyamines at an elevated temperature sufficient to cause the polymerization of (c) and (d) to form the particulate polymer, in a continuous phase in which the particulate polymer is insoluble.

Surprisingly, it has been found that particulate polymer as described hereinabove can be prepared as a stable dispersion in a continuous phase. The so-prepared particulate polymer can be isolated from the continuous phase and redispersed in the same or different continuous phase to produce a different stable dispersion. The stable dispersion can be used in polymers comprising urea and/or urethane linkages to enhance their physical properties. The particulate polymer is particularly useful as a processing aid and a reinforcing filler in flexible polyurethane/urea foams. The particulate polymers of the invention also possess an unexpected relatively high aspect ratio, which advantageously provides enhanced structural reinforcement in a polymer matrix.

DETAILED DESCRIPTION OF THE INVENTION

In one aspect this invention is a solid particulate polymer containing a plurality of urea, thiourea, biuret, and dithiobiuret internal moieties and end groups, as set forth above. The particulate polymer can be a variety of shapes and sizes depending on the nature of the starting materials employed in its preparation and the conditions of preparation. The shape of the particulate polymer may be an irregular and amorphous shape or well defined needles or spheres. The size and shape of the particulate polymer can readily be observed by conventional techniques such as, for example, electron microscopy. Preferably, the particulate polymer has an average size of about 30 microns or less, more preferably about 25 microns or less and most preferably about 15 microns or less. When particulate polymers are prepared where the average particle size is in excess of these values they may not provide for compositions which are stable dispersions or they may not provide for the desired physical properties in an end application.

Again, depending on the starting materials employed, conditions of preparation or subsequent blending with other, similarly defined, particulate polymer, the composition may contain a multi-modal particle size distribution. The multi-modal size distributions may be bi-modal or tri-modal with one or a variety of particle shapes.

The particulate polymer is further characterized in that it contains a plurality of urea, biuret, thiourea, or dithiobiuret moieties or mixtures thereof. The particulate polymer preferably contains a plurality of urea and biuret groups, with urea being the most preferred. By the term plurality, it is understood that the particulate polymer contains on average more than one of such urea, biuret, thiourea, or dithiobiuret moieties.

As mentioned above, this invention is, in one aspect, a solid particulate polymer comprising 1. a backbone containing
   (a) a plurality of moieties selected from the group consisting of alkylene, arylene, aralkylene, alkylarylene, cycloalkylene, alkyleneoxy, and polyalkyleneoxy;
   (b) a plurality of moieties selected from the group consisting of internal urea, thiourea, biuret and dithiobiuret moieties; and
2. end groups selected from the group consisting of urea, thiourea, biuret and dithiobiuret.

When the solid particulate polymer is difunctional, it can be represented by the following formula:

where:
X = independently in each occurrence $NH_2C(O)NH-$, $NH_2C(S)NH-$, $NH_2C(O)NHC(O)NH-$, or $NH_2C(S)NHC(S)NH-$;
Y = independently in each occurrence $-NHC(O)NH-$, $-NHC(S)NH-$, $-NHC(O)NHC(O)NH-$, or $-NHC(S)NHC(S)NH-$;
R = independently in each occurrence alkylene, arylene, aralkylene, alkylarylene, cycloalkylene, alkyleneoxy, or polyalkyleneoxy; and
n = an integer from 2 to 50.

The R groups can have a higher functionality than 2 and produce a branched and/or crosslinked polymer.

The backbone and end groups of these particulate polymers render them essentially neutral. This is important in applications where any residual basicity can interfere with catalytic activity.

The structure of these particulate polymers can be determined by spectrometric techniques such as infrared spectroscopy and nuclear magnetic resonance (NMR) spectroscopy. Carbon-13 NMR is particularly useful, where the carbonyl carbon atoms of terminal carbonyls and internal carbonyls are clearly distinguishable. This technique also provides a means to estimate polymer molecular weight.

The particulate polymers are insoluble in most solvents. However, many of these polymers are soluble in strong acids, such as methanesulfonic acid and sulfuric acid.

The solid particulate polymer of the invention may be prepared by a reaction that comprises contacting (c) one or more carbonyl- or thiocarbonyl-containing compounds selected from the group consisting of urea compounds, biuret compounds, thiourea compounds, and dithiobiuret compounds; and (d) one or more polyamines in a continuous phase.

The particulate polymer is prepared by contacting reactant (c), one or more carbonyl-containing or thiocarbinyl-containing compounds selected from the group consisting of urea compounds, biuret compounds, thiourea compounds, or dithiobiuret compounds, with reactant (d), a polyamine, at an elevated temperature sufficient to cause the polymerization of (c) and (d) resulting in a particulate polymer. The polymerization is effected in a continuous phase in which the particulate polymer is preferably substantially insoluble at ambient temperature. By "substantially insoluble" it is meant that the solubility of the polymer having a plurality of urea, biuret, thiourea, or dithiobiuret moieties is such that phase separation occurs resulting in the appearance of "solid", particulate polymer. If the temperature of the continuous phase is too high or too low and/or the concentration of the particular polymer material insufficient, then phase separating may not be observed. Optionally, the continuous phase contains, if required, an effective amount of a stabilizer compound.

Suitable compounds for preparing the particulate polymer of the invention include urea compounds, biuret compounds, thiourea compounds, dithiobiuret compounds, and mixtures thereof.

Urea compounds suitable for use in preparing the particulate polymer of the invention include urea, methyl urea, ethyl urea, n-butyl urea, 1,3-dimethyl urea, 1,1-dimethyl urea, 1,3-diethyl urea, 1-methyl-1-ethyl urea, 1,1-dibutyl urea, 1,3-dibutyl urea, n-hexyl urea, phenyl urea and diphenyl urea. Urea is the more preferred urea compound.

Thiourea compounds suitable for use in preparing the particulate polymer of the invention include thiourea, methyl thiourea, ethyl thiourea, n-butyl thiourea, 1,3-dimethyl thiourea, 1,1-dimethyl thiourea, 1,3-diethyl thiourea, 1-methyl-1-ethyl thiourea, 1,1-dibutyl thiourea, 1,3-dibutyl thiourea, n-hexyl thiourea, phenyl thiourea and diphenyl thiourea. Thiourea is the more preferred thiourea compound.

Biuret compounds suitable for use in preparing the particulate polymer of the invention include biuret, thiobiuret, 1-methyl biuret, 1,5-dimethyl biuret, 1-ethyl biuret, 1,1-dimethyl biuret, 1-methyl-5-ethyl biuret, 1-hexyl biuret, phenyl biuret and diphenyl biuret. Biuret is the more preferred biuret compound.

Dithiobiuret compounds suitable for use in preparing the particulate polymer of the invention include dithiobiuret, 1-methyl dithiobiuret, 1,5-dimethyl dithiobiuret, phenyl dithiobiuret and diphenyl dithiobiuret. Dithiobiuret is the more preferred compound.

The most preferred compounds for use in preparing the particulate polymer of the invention are urea and biuret.

Suitable polyamine compounds for preparing the particulate polymer of the invention include polyamines which comprise at least two amino groups that can independently be primary or secondary amine groups. Preferably, the polyamine contains two such amine groups and hence are diamine compounds. Preferably, the amine groups of the polyamine are primary amine groups as these are more reactive to the urea, biuret, thiourea, or dithiobiuret-containing compound when preparing the particulate polymer. Suitable polyamines comprise aliphatic, araliphatic, cycloaliphatic or aromatic amines, polyaminated polyether polyols, or mixtures thereof. Preferably, when the polyamine is an aliphatic, araliphatic, cycloaliphatic or aromatic amine it has a molecular weight of from about 60 to about 3000, preferably from about 60 to about 1000, and more preferably from about 60 to about 500.

When the polyamine is a polyaminated polyether polyol, preferably it has a molecular weight of at least about 100, preferably at least about 200, and more preferably at least about 400, but less than about 3000, preferably less than about 2000 and more preferably less than about 1000.

Preferred polyamines for preparing the particulate polymer are diamines and include the aliphatic diamines especially $C_{4-12}$ aliphatic diamines, aromatic diamines, and diaminated polyether polyols.

Specific examples of suitable polyamines include butylenediamine, pentylenediamine, 2-methyl-1,5-pentanediamine, hexamethylenediamine, dodecamethylenediamine, trimethyldiaminohexane, 2,2'-bisaminopropylmethylamine, diethylenetriamine, triethylenetetraamine and tetraethylenepentamine, dipropylenetriamine, piperazine, N,N'-bis-aminoethylpiperazine, triazine, 4-aminobenzylamine, 4-aminophenylethylamine, 1,4-diaminocyclohexane, phenylenediamines, naphthylenediamines, condensates of aniline and formaldehyde such as methylenediphenylamine including bis(4-aminophenyl)methane, toluenediamine, bisaminomethylbenzenes and the derivatives of the above-mentioned aromatic amines monoalkylated in one or both nitrogen atoms, and mixtures thereof. The preferred $C_{4-12}$ aliphatic diamines and aromatic diamines include butylenediamine, hexamethylenediamine, dodecamethylenediamine, methylenediphenylamine, bis(4-aminophenyl)methane and toluenediamine. Especially preferred is butylenediamine, hexamethylenediamine, methylenediphenylamine, bis(4-aminophenyl)methane and toluenediamine.

The $C_{4-12}$ aliphatic diamines may contain minor quantities of $C_{2-3}$ diamines. Such minor quantities are less than 5, preferably less than 3, more preferably less than 1 percent by weight, and most preferably such $C_{2-3}$ diamines are absent.

The presence of such $C_{2-3}$ diamines in quantities greater than these may deter from the efficient preparation of the particulate polymer.

Aminated polyether polyols may be prepared by reductive amination procedures. Suitable procedures for the reductive amination of polyols are described in, for example, U.S. Pat. Nos. 3,128,311; 3,152,998; 3,236,895; 3,347,926; 3,654,370; 4,014,933; and 4,153,581, the relevant portions of which are herein incorporated by reference.

Exemplary of such aminated polyether polyols are those products sold under the tradename of Jeffamine TM by Texaco such as Jeffamine TM D-230 and Jeffamine TM D-400 which are aminated polyoxypropylene polyols that have molecular weights of about 230 and about 400, respectively.

The equivalent ratio of carbonyl- or thiocarbonyl-containing compound to polyamine compound is such so as to provide a particulate polymer which has a plurality of the hereinabove described urea, biuret, thiourea, or dithiobiuret moieties. Preferably, the equivalent ratio of compound(s) comprising component (c) to polyamine is at least about 0.8:1, more preferably at least about 0.8:1, and is preferably no greater than about 1.1:1.

The particulate polymer of the invention may be prepared by contacting a compound selected from the group consisting of urea compounds, biuret compounds, thiourea compounds, or dithiobiuret compounds with a polyamine in a continuous phase. Suitable continuous phase materials are those which permit the formation of the particulate polymer and in which the so-formed particulate polymer is substantially insoluble. Exemplary of suitable continuous phases are those products which have boiling points equivalent to or greater than the temperature required for polymerization reaction and include aromatic hydrocarbons, aromatic ethers, alcohols, diols; and polyols such as a polyether polyol, a polyester polyol, a polycarbonate polyol; or mixtures thereof. When a polyol is employed as the continuous phase, the hydroxyl end groups associated with the polyol are advantageously less reactive towards the urea, thiourea, biuret, or thiobiuret compound(s) than the polyamine present. Preferably, the continuous phase is a polyol.

Suitable polyols for use as the continuous phase in the preparation of the particulate polymers of this invention are those which contain from nominally about two to about eight, and preferably from nominally about two to about four hydroxyl groups per molecule.

Preferably, the equivalent weight of the polyol is at least about 31, preferably at least about 100, more preferably at least about 500 and most preferably at least about 1000, but less than about 4000, preferably less than about 2500 and more preferably less than about 2000.

Polyether polyols suitable for use as the continuous phase may be obtained in known manner by reacting initiator compounds containing reactive hydrogen atoms with alkylene oxides, such as ethylene oxide, propylene oxide, butylene oxide, styrene oxide, tetrahydrofuran or epichlorohydrin, or with mixtures of these alkylene oxides. The initiator may be reacted with mixtures of alkylene oxides in either a random or block sequence.

Suitable initiator compounds containing reactive hydrogen atoms include water, ethylene glycol, 1,2- or 1,3-propylene glycol, 1,4- or 2,3-butylene glycol, 1,6-hexanediol, 1,8-octanediol, 4-bis-hydroxylmethyl cyclohexane, 2-methyl-1,3-propanediol, glycerine, trimethylolpropane, 1,2,6-hexanetriol, 1,2,4-butanetriol, trimethylolethane, pentaerythritol, mannitol, sorbitol, methyl glucoside, sucrose, resorcinol, ammonia, methylamine, ethylene diamine, diethylene triamine, tetra- or hexamethylene diamine, ethanolamine, diethanolamine, triethanolamine, aniline, aniline diamine, 2,4- and 2,6-diaminotoluene and polyphenylpolymethylene polyamines of the type obtained by condensing aniline with formaldehyde, and such like materials.

Polyester polyols suitable for use as the continuous phase in this present invention include reaction products of polyhydric (preferably dihydric and, optionally, trihydric) alcohols with polybasic, preferably dibasic, carboxylic acids. Alternatively, to the use of free polycarboxylic acids, it is possible to use the corresponding polycarboxylic acid anhydride or corresponding polycarboxylic acid esters of lower alcohols or mixtures thereof for producing the polyesters. The polycarboxylic acids may be aliphatic, cycloaliphatic, aromatic and/or heterocyclic and may be substituted (for example by halogen atoms) and/or unsaturated. Examples of suitable carboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, oleic acid, maleic acid anhydride, fumaric acid, dimeric and trimeric fatty acids optionally in admixture with monomeric fatty acids, terephthalic acid dimethyl ester and terephthalic acid-bis-glycol ester. Examples of suitable polyhydric alcohols include ethylene glycol, 1,2- and 1,3-propylene glycol, 1,4- and 2,3-butylene glycol, 1,6-hexanediol, 1,8-octanediol, neopentyl glycol, cyclohexane dimethanol, 2-methyl-1,3-propanediol, glycerol, trimethylolpropane, 1,2,6-hexanetriol, 1,2,4-butanetriol, trimethylolethane, triethylene glycol, tetraethylene glycol, polyethylene glycols, dipropylene glycol, polypropylene glycols, dibutylene glycol and polybutylene glycols. The polyesters may also contain terminal carboxyl groups. Polyesters of lactones such as e-caprolactam, or hydroxy carboxylic acids such as $\omega$-hydroxycaproic acid may also be used.

Suitable polycarbonate polyols for use in the process of preparing particulate polymers and compositions of this invention are those compounds which are described in, for example, U.S. Pat. No. 4,686,276 incorporated herein by reference.

The use of polyether polyols as the continuous phase is preferred, especially when such polyols contain predominant amounts of polymerized ethylene oxide and/or primary hydroxyl groups. By "predominant" it is meant that the polyol contains at least 35, preferably at least 50, and more preferably at least 60 percent primary hydroxyl groups of its total hydroxyl group. Polyether polyols are generally less reactive towards amines than polyester or polycarbonate polyols.

In a more preferred embodiment of the invention, when the continuous phase is a polyether polyol the polyamine used in preparing the particulate polymer of the invention comprises a combination of a $C_{4-12}$ aliphatic diamine or aromatic diamine with a diaminated polyether polyol. In such a preferred combination the aminated polyether polyol may represent up to about 80 weight percent of the total polyamine reacting with the carbonyl-containing compound. Use of larger quantities of aminated polyether polyol may confer solubility of the particulate polymer depending upon the aliphatic or aromatic amine present.

When particulate polymer dispersions in a polyester polyol or polycarbonate polyol continuous phase are desired, it is preferable to isolate a particulate polymer prepared in some other continuous phase and redisperse in a polyester polyol or polycarbonate polyol. However, polyester and polycarbonate polyols may be employed as the continuous phase for the preparation of the particulate polymer when the relative reactivity of the internal ester groups of such polyols towards amine groups is such that they do not substantially interfere with the reaction of the amine groups with the urea, biuret, thiourea, or dithiobiuret compounds in the forming of the particulate polymer. In general, the interference of such ester groups may be minimized by selecting urea, biuret, thiourea, or dithiobiuret compounds which have a higher degree of relative reactivity with amine groups. For example, biuret tends to be more reactive with an amine than urea. In addition, the interference of such ester groups may also be minimized by using lower processing temperatures.

Preferably, the particulate polymer is employed as a composition comprising a dispersion of the polymer in a continuous phase. When so employed, the composition preferably contains the particulate polymer in from at least 0.1, preferably at least about 5 and more preferably at least about 8, and up to about 50, preferably up to about 40 and more preferably up to about 30 percent by weight of the total weight of the continuous phase and particulate polymer present. Compositions that contain lesser or greater amounts of the particulate polymer may provide any significant improvements in the physical properties of polyurethane polymers prepared therefrom, lead to viscosities too great for processing, or not be stable dispersions.

The continuous phase can comprise one or more compounds in which the particulate polymer will form a stable dispersion at ambient conditions. By "stable dispersion" it is understood that the particulate polymer in the continuous phase will not agglomerate in, or cause to solidify, the composition to any significant degree thus preventing its further use in a desired application. Advantageously, the dispersion is stable for at least 2 weeks, preferably at least 4 weeks, and more preferably at least 12 weeks.

The particulate polymer is preferably substantially non-reactive with respect to the continuous phase. Preferably, the continuous phase is a liquid at ambient temperature, but it can also be a meltable solid such as a thermoplastic polymer or certain polyester polyols.

When the continuous phase is a liquid, the preferred liquids are those as discussed later when defining the continuous phase employed in the process of preparing the particulate polymer. The more preferred continuous phases for the composition are polyahls, such as a polyether polyol, a polyester polyol, a polycarbonate polyol; or mixtures thereof. Especially preferred as continuous phase are polyether polyols because of their suitability to preparing polymer matrices containing urethane and/or urea linkages. A polyether polyol which has from nominally two to about four isocyanate-reactive hydrogen atoms per molecule and a hydroxyl equivalent weight of at least 500, and preferably from about 500 to about 2500, is the most preferred continuous phase for the polymer composition.

The continuous phase of the composition can be that used in a preferred process of preparing the particulate polymer, whereby the particulate polymer is formed and dispersed in situ. In this instance, the polymer composition is a product obtained directly from a process of preparing the particulate polymer in a continuous phase, and the particulate polymer content of the composition is as obtained from the process.

When a composition containing a lower weight percentage of particulate polymer than provided for by the in situ process is desired, this may be achieved by blending in additional amounts of a continuous phase. The additional amounts of continuous phase can be either the same continuous phase as used in the preparation of the particulate polymer, or another continuous phase which is miscible with the first and compatible with the intended end use of the composition.

Compositions containing the particulate polymer at a higher weight percentage than obtained by the in situ process can be prepared by removal of some of the continuous phase through a suitable procedure such as, for example, distillation.

Alternatively, the particulate polymer may be isolated from the continuous phase of the process of its preparation by, for example, filtration, and then blended and redispersed in a continuous phase at a desired weight content to give a stable dispersion. In this case, such continuous phases for the redispersion of the particulate polymer may be completely different from that used in the process of making the particulate polymer. Exemplary of completely different continuous phases for redispersion are thermoplastic polymers or organic polyisocyanates.

The preparation of the solid particulate polymer takes place in the continuous phase which preferably contains a stabilizer compound. The stabilizer compound serves to stabilize the particulate polymer and permits the formation of a stable dispersion in the continuous phase. Depending on the carbonyl-containing compound, polyamine and continuous phase employed in preparing the particulate polymer composition of the invention, a stabilizer compound may or may not be required, but preferably is present. A stabilizer compound is also preferably employed when the stable dispersion of the invention is prepared where the continuous phase is different from that used in the process of making the particulate polymer or where the concentration of the particulate polymer is different from that obtained in its process, it may be advantageous to employ a stabilizer compound.

When employed, the stabilizer compound is present in a quantity sufficient to provide for a stable dispersion in a continuous phase. Preferably, such quantity is less than about 15.0, preferably less than about 10.0 and more preferably less than about 5.0 percent by weight of the combined weights of the continuous phase and particulate polymer present.

A stabilizer compound advantageously provides a chemical and/or physical means of compatibilizing the particulate polymer with the continuous phase, allowing for the formation of a stable dispersion. The stabilizer compound may be an interreactive stabilizer compound and contain a reactive functional group which can participate in the chemistry associated with the formation of the particulate polymer by reacting with the reactants necessary for the formation of the particulate polymer. Alternatively, the stabilizer compound may be a non-interreactive stabilizer compound containing no interreactive functional group and operate by providing for physical compatibility or miscibility of particulate polymer and continuous phase. When the particulate polymer is stabilized in the continuous phase by a stabilizer compound which has a functional group that can react with the reactants necessary for the formation of the particulate polymer, the remaining part of the stabilizer compound is preferably compatible with the continuous phase. In one preferred embodiment, one part of the stabilizer compound is structurally similar to and compatible with continuous phase, while another part of the stabilizer molecule is structurally similar to and attracted to the surface of the particulate polymer.

In a second aspects, this invention is a stabilizer compound containing a plurality of urea, biuret, thiourea, or dithiobiuret moieties which is the reaction product of
  (a) a partially aminated poly(alkylene glycol) and/or a fully aminated monoalkylene glycol;
  (b) one or more carbonyl- or thiocarbonyl-containing compounds selected from the group consisting of a urea compound, a biuret compound, a thiourea compound and a dithiobiuret compound; and
  (c) one or more polyamines, at an elevated temperature sufficient to cause the reaction between (a), (b), and (c) to form the stabilizer compound.

Stabilizer compounds of this type can be represented by the following general structure:

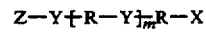

where:
  X = independently in each occurrence NH$_2$C(O)NH—, NH$_2$C(S)NH—, NH$_2$C(O)NHC(O)NH—, or NH$_2$C(S)NHC(S)NH—;

Y = independently in each occurrence —NH-C(O)NH—, —NHC(S)NH—, —NHC(O)NH-C(O)NH—, or —NHC(S)NHC(S)NH—;

Z = the residue of a partially aminated poly(alkylene glycol) and/or a fully aminated monoalkylene glycol after removal of a hydrogen atom from a terminal amine group;

R = independently in each occurrence alkylene, arylene, aralkylene, alkylarylene, cycloalkylene, alkyleneoxy, or polyalkyleneoxy; and m = an integer from 1 to 20.

The R groups can have a higher functionality than 2 and produce a branched and/or crosslinked polymer.

Preferably, the stabilizer compound is one which contains a functional group which will react with at least one of the reaction components in the process for the preparation of the particulate polymer. Such compounds are prepared from amine and carboxylic acid compounds, particularly monoamine and monocarboxylic acid compounds. The monoamine and monocarboxylic acid compounds are preferably high molecular weight compounds of similar composition to the continuous phase employed when preparing the particulate polymer. Preferably, the molecular weight of such a monoamine or monocarboxylic acid is at least 400, preferably at least 1000, more preferably at least 2000, and most preferably at least 4000.

Exemplary of partially aminated poly(alkylene glycols) which may be used to prepare interreactive stabilizer compounds include monoamine compounds such as Texaco M-2005 (an aminated 2-methoxyethanol-initiated propylene oxide adduct which has a molecular weight of about 2000); and products which can be obtained by reductive amination of available polyether polyols. A commercially available polyether polyol is, for example, the polyether triol, Voranol ™ 4701 sold by The Dow Chemical Company which can be subjected to reductive amination giving a product which has a molecular weight of about 5000 and on average about 30 percent of its hydroxyl groups converted to amine groups, and is therefore nominally a monoamine.

A sufficient quantity of stabilizer compound is employed in the process to provide the particulate polymer as defined by the invention. Preferably, the quantity of stabilizer compound employed is at least about 0.1, preferably at least about 5.0, more preferably at least about 10.0 and most preferably at least about 15.0, but less than about 30.0 percent by weight of total weights of (c) the carbonyl-containing compound, and (d) the polyamine used in preparing the particulate polymer. The above quantities of stabilizer compound are present in the continuous phase in less than about 15.0 percent, preferably less than about 10.0 percent, and more preferably less than about 5.0 percent by weight of the total weight of the continuous phase and stabilizer compound.

The quantities of reactants, polyamine and carbonyl-containing compound, in relation to continuous phase and optional stabilizer compound used in the process of preparing the particulate polymer, are such so as to provide a discrete particulate polymer in the continuous phase. Preferably, the quantities of reactants and reaction conditions are such to provide an end product from the process which contains the particulate polymer in from at least 0.1, preferably at least about 5 and more preferably at least about 8, and up to about 50, preferably up to about 40 and more preferably up to about 30 percent by weight of the total weight of the continuous phase and reactants employed.

In one preferred method for the preparation of the particulate polymer, the continuous phase and optional stabilizer compound or amino precursor of the stabilizer compound are preferably introduced into a suitable reactor preferably padded with an inert atmosphere such as nitrogen. The stabilizer compound can be made in the reaction vessel just prior to particulate polymer formation or it can be made as a stabilizer compound concentrate. A portion of a concentrate batch of preformed stabilizer compound could then be used in subsequent particulate polymer preparations. The polyamine and carbonyl-containing compound to be polymerized can be fed into the charged reactor in one or in a multiple of steps before and during the polymerization reaction. They may be fed as a premixed combination or independently.

An advantage of using a multiple step procedure is that it allows for the formation of a stabilizer prior to formation of the particulate polymer. The stabilizer, if desired, can be retained and subsequently used in other preparations, covered by the scope of the inventions where variables such as reactants, continuous phase or reaction conditions differ, thus giving the possibility of preparing particulate polymers having mixed compositions and/or specifically controlled particle size(s) and range(s).

To effect the polymerization of the polyamine with the carbonyl-containing compound, it is necessary to heat the contents of the reactor. The temperature needs to be sufficient to promote polymerization without being harmful to the process, reactants or products. The required reaction temperatures will be dependent on the nature of the reactants and continuous phase. Preferably, an elevated temperature of at least about 50° C., preferably at least about 80° C. and more preferably at least about 100° C., and up to about 200° C., preferably up to about 175° C., more preferably up to about 150° C. and most preferably up to about 120° C. is employed. Use of different carbonyl-containing compounds to prepare the polymer can influence the preferred temperature ranges for operating the process. When the carbonyl-containing compound to be reacted is urea, the reaction temperature is preferably in the range of from about 100° C. to about 175° C. When the carbonyl-containing compound is biuret then advantageously the reaction temperature is preferably in the range of from about 50° C. to about 150° C. In addition, particles with higher aspect ratios may be obtained by carrying out the reaction to form the particulate polymer at a temperature in the range of from about 140° C. to about 175° C.

The contents of the reactor are maintained at the elevated temperature with continuous stirring until the polymerization reaction is terminated. In the case when reacting urea with a polyamine, the reaction is terminated when ammonia ceases to be evolved, or when the amine concentration (from the polyamine) as measured by, for example, titrometric procedures is seen to be constant with time. Typically, it may take up to 30 hours to reach a state of termination, but this is dependent on the type of reactants, temperature and continuous phase employed.

Although not critical to the formation of the particulate polymer, the rate or type of stirring may influence the particle size, the size distribution, and particle stability. High stirring rates under high shear conditions can favor the production of particulate polymer with smaller particle sizes.

If desired, the pressure within the reactor can be reduced below one atmosphere to promote the polymerization reaction. At reduced pressures, reaction by-products such as ammonia, when urea or biuret are employed, or water when a polycarboxylic acid compound is used as the carbonyl-containing compound, or a lower alcohol when polycarboxylic acid esters of a lower alcohol is used as the carbonyl-containing compound, can readily be removed encouraging formation of desired product.

If required, catalysts may be used to promote the polymerization reaction. Suitable catalysts are any basic compound which is compatible with the polymerization reaction, reactants and products, and include for example, sodium hydroxide, potassium hydroxide and tertiary amines such as triethylamine or N-methyl pyrrolidine. Metal salts are also useful catalysts when polycarboxylic acid esters of lower alcohols are used as the carbonyl-containing compound. Such catalysts include, for example, dibutyltin oxide, zinc oxide and titanium isopropoxide. When used, such catalysts are present in a catalytic quantity sufficient to obtain the desired increase in rate of polymerization. Preferably, when employed, the quantity of catalyst is less than about 2 percent, preferably less than about 1 percent and more preferably less than about 0.5 percent by weight of total weights of components (c), (d) and continuous phase employed in the process.

When the polymerization reaction is terminated, the product obtained is a particulate polymer dispersed in a continuous phase. The particulate polymer as a stable dispersion may be used directly in a desired application, if the continuous phase is compatible to that application.

In some preparations, the continuous phase may contain quantities of non-polymerized reactants, especially polyamine. The presence of such unreacted polyamine leads to the presence of amino moieties which are not desirable if the continuous phase part of the dispersion is to be used directly in the preparation of, for example, polyurethane polymer matrices. Amine moieties containing hydrogen on the nitrogen center can react with isocyanates. In addition, amine compounds can also function as catalyst in the formation of polyurethane polymer and therefore their presence may present problems with respect to processing and reactivity.

The presence of unreacted amine moieties from the polyamines and any intermediate reaction products can be determined by suitable acid-base titration procedures. They can be removed from the continuous phase by treating with an appropriate quantity of the carbonyl-containing compound under the conditions of polymerization. Alternatively, or in addition to this treatment, if required, any remaining amount of unreacted amine moieties can be removed by using a suitable amine scavenger such as for example, benzoyl chloride or phosphoric acid. However, with both alternatives, reactants and conditions employed are chosen so as to preserve and not destroy the particulate polymer dispersion in the continuous phase, and provide an end product which is free of unreacted amine moieties.

Alternatively, the particulate polymer may be isolated by removing the continuous phase. The continuous phase may be removed, for example, by distillation, or preferably the particulate polymer may be collected by a filtration process and dried to give a powder. In this case, treatment of the continuous phase to remove or convert any residual starting material containing amino moieties or other functional groups is optional. The particulate polymer in powder form can then be used directly in the desired applications and, for example, redispersed in a continuous phase.

In a third aspect, this invention is a urethane/urea polymer, such as a flexible foam, the polymeric matrix of which contains the particulate polymer described above. This particulate polymer is particularly useful as a processing aid and a reinforcing filler in flexible polyurethane/urea foams. The particulate polymer is present in an amount sufficient to provide improved mechanical properties, such as, for example, impact strength and flexural modulus. Preferably, the particulate polymer is present in an amount, based on the weight of the polymer, of at least about 0.1 percent, more preferably at least about 0.5 percent, and most preferably at least about 1.0 percent; and is preferably no greater than about 40 percent, more preferably no greater than about 25 percent, and most preferably no greater than about 20 percent.

The urethane/urea polymer may be prepared by adding the desired amount of particulate polymer to an isocyanate-reactive composition, which is then reacted with a polyisocyanate in the presence of a blowing compound. Processes suitable for the preparation of polyurethane foams are described, for example, in U.S. Pat. Nos. 4,386,167, 4,425,468, and 4,668,734, which are hereby incorporated by reference in their entirety.

ILLUSTRATIVE EMBODIMENTS

The following examples are illustrative of the present invention but are not to be construed as limiting the scope thereof. Unless stated otherwise, all parts and percentages are given by weight.

EXAMPLE 1

This example illustrates the preparation of a stable particulate polymer dispersion by a two-step procedure involving an intermediate product.

To a silanized glass reactor is added 800 parts of a continuous phase, or polyether polyol, Voranol TM 4702 (an ethylene oxide/propylene oxide adduct of glycerine, equivalent weight about 1610 and primary hydroxyl content of 82 percent: sold by The Dow Chemical Company), 1.0 part of urea, 1.12 parts of hexamethylene-1,6-diamine and 16.0 parts of a stabilizer compound, an ethylene oxide/propylene oxide adduct of glycerine, hydroxyl equivalent weight about 1610 and primary hydroxyl content of 82 percent which has 30.6 percent of its hydroxyl groups converted to amine moieties). The reactor is purged with nitrogen and the mixture heated at about 140° C. to about 150° C. for about 18 to about 20 hours whilst continuously stirring. The resulting intermediate product is a turbid, grey liquid with a viscosity of about 1230 cps at 25° C.

To the intermediate product in the glass reactor is added a further 34 parts of urea and 65.6 parts of hexamethylene-1,6-diamine. The urea and diamine, as a mixture, are added to the reactor periodically, about every 30 minutes, in portions of about 7 to about 8 parts whilst continuously stirring and maintaining the temperature at about 140° C. to about 150° C. The contents of the reactor are stirred until titrometric analysis shows no change in amine concentration.

The resulting particulate polymer (polyurea) in the continuous phase is then treated with a further 4.0 parts of urea, and stirred for about 20 hours at about 140° C.

to about 150° C. before purging the headspace of the reactor with nitrogen to remove any non-polymerized starting material and/or volatile products.

After purgings the particulate polymer and continuous phase are treated with 1.7 parts of benzoyl chloride, to give a finished product. On cooling, the finished product is a stable particulate polyurea dispersion which has a viscosity of about 2200 cps at 25° C., a particulate polymer content of about 9.1 percent by weight, with particle size ranges of about 1 to 10 microns.

EXAMPLE 2

This example illustrates the preparation of a stable particulate polymer dispersion by a one-step procedure. All reactants are charged in one procedures with no intermediate product being isolated.

All conditions and subsequent procedures are as for Example 1.

Details of the polyamine, carbonyl-containing compound, continuous phase and stabilizer compound are given in Table I. The particulate polymer content, particle size, viscosity and hydroxyl number of the resulting stable particulate polymer dispersions are also given in Table I.

EXAMPLES 3 to 7

These examples illustrate the preparations of stable particulate polymer dispersions employing reactants at different concentrations. The products are prepared according to the procedure of Example 2.

Details of the polyamine, carbonyl-containing compound, continuous phase and stabilizer compound are given in Table I. The particulate polymer content, particle size, viscosity and hydroxyl number of the resulting stable particulate polymer dispersions are also given in Table I.

and then dried in a vacuum oven for about 16 hours at 120° C./<1 mm Hg to give a white powder.

A new polyurea dispersion is prepared by dispersing 15 parts of the isolated white powder in 60 parts of a continuous phase, a polyether polyol, Voranol ™ 4702 sold by The Dow Chemical Company.

The resulting stable polyurea dispersion prepared in this manner has a particulate polymer content of 20 percent by weight and an equivalent weight of 2040.

EXAMPLES 9 and 10

Examples 9 and 10 are polymers containing urethane and/or urea linkages, prepared with the stable particulate dispersions of Examples 1 and 8, respectively.

The polymers prepared are plaques of 4"×4"×0.125" prepared according to the following procedure, with the formulations given in Table II.

All components are degassed separately under vacuum, then mixed together in a common container in the amounts specified in Table II. The mixture is vigorously stirred with a mechanical mixer for 10 to 30 seconds and then poured into an ambient temperature steel plaque mold whose surfaces have been treated with a teflon-based mold release compound. The mold is closed, bolted shut, and placed in a suitable oven at 120° C. for about 2.5 hours. After cooling to room temperature the part is removed from the mold, and its physical properties observed.

The modulus properties are summarized in Table III. Sample A is a control, containing a theoretical 30 percent (wt/wt) hard segment. Samples 9 and 10 show the effect of adding 6 percent and 14 percent (wt/wt) polyurea solids, respectively, to this base elastomer. Samples B and C are controls which show the effect of adding 6 percent and 14 percent (wt/wt) hard segment to the base elastomer (Example A).

The soft segment glass transition temperature and

TABLE I

| Ex. | CPA[1] (pbw) | Polyamine (pbw) I[2] | Polyamine (pbw) II[3] | C=O[4] | Stabilizing Agent (pbw) A[5] | Stabilizing Agent (pbw) B[6] | Reaction Temp (°C.) | Reaction Time (hr) | % PPC[7] | APS[8] (μ) | Vis[9] (cps) | OH No.[10] |
|---|---|---|---|---|---|---|---|---|---|---|---|---|
| 2 | 270 | 15.0 | 15.0 | 9.86 | — | — | 175 | 22.5 | 10.5 | N.O. | 3410 | 31.3 |
| 3 | 270 | 13.5 | 13.5 | 8.89 | 3.0 | — | 175 | 21.5 | 7.7 | 5 | 1776 | 32.3 |
| 4 | 270 | 6.0 | 18.0 | 5.67 | 6.0 | — | 175 | 22.0 | 9.1 | 5 | 2188 | 31.8 |
| 5 | 270 | 27.0 | — | 13.97 | 3.0 | — | 175 | 24.0 | 5.1 | 5 | 1180 | 33.2 |
| 6 | 225 | 30.0 | 30.0 | 19.80 | 15.0 | — | 175 | 22.0 | 24.2 | N.O. | 21100 | 26.5 |
| 7 | 308 | 15.4 | 15.4 | 10.18 | — | 3.43 | 175 | 27.0 | 8.5 | N.O. | 2204 | 32.0 |

[1] Continuous Phase A is an ethylene oxide/propylene oxide adduct of glycerine; OH No. 35, primary OH 82 percent
[2] Polyamine I is hexamethylene-1,6-diamine
[3] Polyamine II is Jeffamine D-400 sold by Texaco (an aminated polypropylene glycol)
[4] C=O, carbonyl-containing compound, for Examples 2 to 7, urea
[5] An ethylene oxide/propylene oxide adduct of glycerine; OH No. 35, primary Oh 82 percent which is partially aminated, 30.6 percent of hydroxyl groups converted to amine moieties
[6] Jeffamine M-2005 sold by Texaco (an aminated 2-methoxyethanol-initiated propylene oxide adduct, molecular weight 2000)
[7] Particulate polymer content of dispersion, percent by weight
[8] Average particle size - N.O. - Not observed
[9] Viscosity
[10] Hydroxyl number

EXAMPLE 8

Isolation and Redispersion of a Particulate Polymer in a Polyether Polyol

To 160 parts of the particulate polyurea dispersion obtained in Example 1 is added 500 parts of a mixture consisting of 70 volume percent isooctane and 30 volume percent toluene. The resulting slurry is stirred and then filtered using a suitable fine porosity glass filter and the particulate polyurea isolated.

The particulate polyurea is washed several times with the mixture to remove all traces of the continuous phase flexural storage modulus in the glassy region (E' at −125° C.) are unaffected by any of the changes. Samples B and D show a definite increase in plateau modulus when the polyurea solids are added, and this increase is greater than that observed when extra hard segment is added, as in Samples B and C. Likewise, the rubbery plateau is extended to higher temperatures when the polyurea solids are present (temperature at which E'= 10 psi), and the increase is more than that observed when extra hard segment is added.

This example illustrates the properties to be obtained for a polymer matrix comprising the particulate polymer of the invention compared to a polymer matrix where it is necessary to modify substantially the components used in preparing the matrix to achieve the same performance.

TABLE II

| | Elastomer Formulations | | | | | | | |
|---|---|---|---|---|---|---|---|---|
| Sample | Parts Voranol® 4702[1] | Parts Dispersion | Parts 1,4-BDO[2] | Parts Isonate® 143LM[3] | Parts DBTDL[4] | Wt % Hard Segment | Wt % Polyurea Solids | Wt % Total Reinforcement |
| A* | 70 | — | 5.46 | 24.54 | 0.009 | 30 | 0 | 30 |
| 9 | — | 70[5] | 5.46 | 23.97 | 0.007 | 30 | 6 | 36 |
| B* | 64 | — | 6.97 | 29.03 | 0.011 | 36 | 0 | 36 |
| 10 | — | 70[6] | 5.70 | 24.25 | 0.006 | 30 | 14 | 44 |
| C* | 56 | — | 8.99 | 35.01 | 0.005 | 44 | 0 | 44 |

*Not an example of this invention
[1] Equivalent weight = 1635 g/eq
[2] 1,4-Butanediol
[3] Mixture of methylene-bis(4-phenylisocyanate) and polycarbodiimide products sold by The Dow Chemical Company
[4] Dibutyltin dilaurate
[5] Particulate polymer dispersion of Example 1
[6] Particulate polymer dispersion of Example 8

TABLE III

| | Physical properties of Polyurethane Elastomers | | | | | | |
|---|---|---|---|---|---|---|---|
| | Tan Delta Peak | Temp @ E' = | E' × 10$^3$ psi | | | | |
| Sample | (°C.) | 10 psi | −125° C. | 25° C. | 100° C. | 125° C. | 150° C. |
| A* | −34 | 164 | 536 | 2.72 | — | 0.59 | — |
| 9 | −33 | 188 | 527 | 7.76 | 4.31 | 2.20 | 0.720 |
| B* | −32 | 175 | 593 | 6.46 | 3.08 | 1.24 | — |
| 10 | −41 | 194 | 535 | 19.4 | 10.1 | 7.55 | 4.44 |
| C* | −33 | 179 | 542 | 12.6 | 5.93 | 4.23 | 2.29 |

*Not an example of this invention.

EXAMPLE 11

Preparation of a Stabilizer Compound Concentrate Based on Urea, 1,6-Hexanediamine and a Partially Aminated Voranol To a reactor is added 640 parts of a continuous phase, a polyether polyol, Voranol TM 4702 (an ethylene oxide/propylene oxide adduct of glycerine, equivalent weight about 1610 and primary hydroxyl content of 82 percent, sold by The Dow Chemical Company), 11.12 parts of urea, 11.52 parts of 1,6-hexanediamine, and 207.2 parts of an aminated polyether polyol (an ethylene oxide/propylene oxide adduct of glycerine, hydroxyl equivalent weight about 1610 and primary hydroxyl content of 82 percent which has been partially aminated so that 30.6 percent of its hydroxyl groups are converted to amine moieties). The reactor is purged with nitrogen and the mixture is heated to about 150° C. for 20 hours. The resultant stabilizer compound concentrate is cooled to ambient temperature and characterized and used as a stabilizer compound in subsequent urea dispersion preparations.

EXAMPLE 12

This example illustrates the preparation of a stable particulate polymer dispersion using the stabilizer compound concentrate of Example 11

To a silanized glass reactor is added 742 parts of a continuous phase, a polyether polyol, Voranol TM 4702 (an ethylene oxide/propylene oxide adduct of glycerine, equivalent weight about 1610 and primary hydroxyl content of 82 percent; sold by The Dow Chemical Company) and 87 parts of the stabilizer compound concentrate of Example 11. The reactor is purged with nitrogen and the mixture is heated to about 150° C. Urea (42.26 parts) and 1,6-hexanediamine (81.6 parts) are ground together and well mixed in a jar in a nitrogen environment. Incriments (−10.2 parts) of the urea/1,6-hexanediamine mixture are added to the reactor over a total time of 48 hours. The contents of the reactor are stirred until titrometric analysis shows no change in amine concentration.

The resulting particulate polymer (polyurea) in the continuous phase is then treated with a further 4.1 parts of urea, and stirred for about 72 hours at about 150° C. before purging the headspace of the reactor with nitrogen to remove any non-polymerized starting material and/or volatile products.

After purging, the particulate polymer and continuous phase are treated with 1.7 parts of benzoyl chloride, to give a finished product. On cooling, the finished product is a stable particulate polyurea dispersion which has a viscosity of about 2300 cps at 25° C., a particulate polymer content of about 12.5 percent by weight, with particle size ranges of about 1 to 10 microns.

The following examples illustrate the use of different carbonyl-containing compounds, polyamines and continuous phase for preparing the particulate polymer and dispersions thereof.

EXAMPLE 13

A Particulate Polymer Composition Where the Particulate Polymer is Prepared from Urea and Bis(4-aminophenyl)methane To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent; sold by The Dow Chemical Company), 0.16 part of urea, 0.24 part of bis(4-aminophenyl)methane, and 2.0 parts of an aminated polyether polyol (an ethylene oxide/propylene oxide adduct of glycerine, hydroxyl equivalent weight about 1610 and primary hydroxyl content of 82 percent which has been partially aminated so that 30.6 percent of its hydroxyl groups are converted to amine moieties). The reactor is purged with nitrogen and the mixture is heated from about 140° C. to about 150° C. for about 18 to about 20 hours whilst continuously stirring. The resulting intermediate product (stabilizer) is a transparent, light orange liquid with a viscosity of about 940 cps at 25° C.

To the intermediate product in the reactor is added further 2.72 parts of urea and 8.86 parts of bis(4-aminophenyl)methane. The urea and diamine are added to the reactor periodically as a mixture, about every 45 minutes, in portions of about 1.5 parts by weight while continuously stirring and maintaining the temperature at about 140° C. to about 150° C. The contents of the reactor are stirred continuously until titrometric analysis shows that the amine concentration is constant, in this case about 21 hours.

The resulting particulate polymer (polyurea) in the continuous phase is then treated with a further 1.0 part of urea, and stirred for about 40 hours at about 140° C. to about 150° C.

On cooling, the finished product is a stable particulate polyurea dispersion which has a viscosity of about 3300 cps at 25° C. The particulate polymer content is about 9.1 percent, with particle sizes ranging from about 0.1 to about 15 microns.

EXAMPLE 14

A Particulate Polymer Composition Where the Particulate Polymer is Prepared from Biuret and Bis(4-aminophenyl)methane To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent, sold by The Dow Chemical Company), 0.25 part of biuret, 0.24 part of bis(4-aminophenyl)methane, and 2.0 parts of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated From about 140° C. to about 150° C. for about 18 to about 20 hours while continuously stirring. The resulting intermediate product is a transparent light orange liquid with a viscosity of about 1040 cps at 25° C.

To the intermediate product in the reactor is added further 3.85 parts of biuret and 7.41 parts of bis(4-aminophenyl)methane. The biuret and diamine are added, as a mixture. to the reactor periodically, about every 45 minutes, in portions of about 1.5 parts by weight while continuously stirring and maintaining the temperature at about 140° C. to about 150° C. The contents of the reactor are stirred continuously until titrometric analysis shows that the amine concentration is constant, in this case about 60 hours.

On cooling, the finished product is a stable particulate polybiuret dispersion which has a viscosity of about 3600 cps at 25° C. The particulate polymer content is about 9.1 percent, with particle sizes ranging from about 0.1 to about 25 microns. SEM indicates that the particles are spherical.

EXAMPLE 15

A Particulate Polymer Composition Where the Particulate Polymer is Prepared in a Different Continuous Phase To a reactor is added 100 parts of a continuous phase, a polyether polyol, VORANOL TM 5287 (an ethylene oxide/propylene oxide adduct of propylene glycol, equivalent weight about 1000; sold by The Dow Chemical Company), 0.14 part of urea, 0.15 part of hexamethylene-1,6-diamine, and 2.0 parts of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for about 18 to about 20 hours while continuously stirring. The resulting intermediate product is a turbid gray liquid.

To the intermediate product in the reactor is added further 4.29 parts of urea and 8.28 parts of hexamethylene-1,6-diamine. The urea and diamine are added, as a mixture, to the reactor periodically, about every 45 minutes, in portions of about 1.33 parts by weight while continuously stirring and maintaining the temperature at about 140° C. to about 150° C. The contents of the reactor are stirred continuously until titrometric analysis shows that the amine concentration is constant, in this case about 21 hours. The resulting particulate polymer (polyurea) in the continuous phase is then heated with a further 0.51 part urea, and stirred for about 15 hours at about 140° C. to 150° C.

On cooling, the finished product is a stable particulate polyurea dispersion which has a viscosity of about 1170 cps at 25° C. The particulate polymer content is about 9.1 percent, with particle sizes ranging from about 0.1 to about 25 microns. SEM indicates that the particles are spiral fiber bundles.

EXAMPLE 16

Example of Redispersion of a Particulate Polymer in a Polyester Polyol

To 100 parts of the particulate polyurea dispersion obtained in Example 1 is added 225 parts of a mixture consisting of 70 volume percent isooctane and 30 volume percent toluene. The resulting dispersion is stirred and then filtered using a suitable fine porosity glass filter and the particulate polyurea isolated.

The particulate polyurea is washed several times with the solvent mixture to remove all traces of the continuous and then dried in a vacuum oven for 16 hours at 120° C./<1 mm Hg to give a white powder.

A new polyurea dispersion is prepared by dispersing 10 parts of the isolated white powder in 90 parts of a continuous phase, Formrez 11-56 (a polyester polyol made by Witco Corporation; the reaction product of diethylene glycol and adipic acid, equivalent weight about 1000).

The resulting stable polyurea dispersion prepared in this manner has a particulate polymer content of 10 percent by weight, viscosity of 30,000 cps at 25° C. and an equivalent weight of about 1100 g/eq OH.

EXAMPLE 17

Preparation of a Particulate Polymer from Thiourea and Hexamethylene-1,6-diamine To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent; sold by The Dow Chemical Company), 0.19 part of thiourea, 0.13 part of hexamethylene-1,6-diamine, and 2.0 parts of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for about 18 to about 20 hours while continuously stirring. The resulting intermediate product (stabilizer) is a transparent, light orange liquid with a viscosity of about 840 cps at 25° C.

To the intermediate product in the reactor is added further 4.81 parts of thiourea and 7.38 parts of hexamethylene-1,6-diamine. The urea and diamine, as a mixture, are added to the reactor periodically, about every 45 minutes, in portions of about 2.0 parts by weight while continuously stirring and maintaining the temperature at about 140° C. to about 150° C. The contents of the reactor are stirred constantly, until titrometric analysis shows that the amine concentration is constant, in this case about 19 hours.

On cooling, the finished product is a transparent yellow liquid which has a viscosity of about 3700 cps at 25° C. The polymer content is 9.1 percent. On heating to above about 65° C., the product is an opaque white liquid, a dispersion of poly(hexamethylene thiourea), which has a viscosity of about 150 cps at 75° C.

EXAMPLE 18

Example of a Particulate Polymer Composition Containing 5 Percent by Weight Particulate Polymer Prepared in situ from Urea and Bis(4-aminophenyl)methane To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent; sold by The Dow Chemical Company), 0.07 part of urea, 0.10 part of bis(4-aminophenyl)methane, and 0.91 part of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for about 4 to 8 hours while continuously stirring. The resulting intermediate product is a transparent, light orange liquid.

To the intermediate product in the reactor is added further 1.33 parts of urea and 4.42 parts of bis-(4-aminophenyl)methane. The urea and diamine are added to the reactor periodically, about every 30 minutes, in portions of about 0.7 part while continuously stirring and maintaining the temperature at about 140° C. to about 150° C. The contents of the reactor are stirred continuously for about 18 hours.

On cooling, the finished product is a stable particulate polyurea dispersion which has a viscosity of about 2000 cps at 25° C. The particulate polymer content is about 4.8 percent, with particle sizes ranging from about 0.1 to about 15 microns.

EXAMPLE 19

Preparation of a Particulate Polymer Composition Where the Particulate Polymer is Prepared from Urea and Hexamethylene-1,6-diamine in the Presence of a Stabilizer Compound, Jeffamine TM M-2005

To a reactor is added 100 parts of a continuous phase, a polyether polyol, VORANOL ® 4702 (an ethylene oxide/propylene oxide adduct of glycerine, equivalent weight about 1610 and primary hydroxyl content of 82.0 percent; sold by The Dow Chemical Company), 0.15 part of urea, 0.16 part of hexamethylene-1,6-diamine, and 0.50 part of Jeffamine TM M-2005 (an ethylene oxide/propylene oxide adduct of 2-methoxyethanol, molecular weight about 2000, which has been aminated so that its hydroxyl groups are converted to amine moieties, sold by Texaco Chemical Company). The reactor is purged with nitrogen and the mixture is heated from about 140° C. to about 150° C. for about 18 to about 26 hours while continuously stirring. The resulting intermediate product (stabilizer) is a turbid gray liquid with a viscosity of 970 cps.

To the intermediate product in the reactor is added further 4.29 parts of urea and 8.22 parts of hexamethylene-1,6-diamine. The urea and diamine are added to the reactor periodically, about every 45 minutes, in portions of about 1.33 parts while continuously stirring and maintaining the temperature at about 140° C. to about 150° C. The contents of the reactor are stirred continuously until titrometric analysis shows that the amine concentration is constant, in this case about 33 hours. The resulting particulate polymer (polyurea) in the continuous phase is then treated with a further 0.43 part of urea, and stirred for about 23 hours at about 140° C. to 150° C. before purging the headspace with nitrogen to remove any non-polymerized starting materials and/or volatile products.

On cooling, the finished product is a stable particulate polyurea dispersion which has a viscosity of about 2400 cps at 25° C. The particulate polymer content is about 9.1 percent, with particle sizes ranging from about 0.1 to about 25 microns. SEM indicates that the particles are spiral fiber bundles.

EXAMPLE 20

Preparation of a Particulate Polymer Composition Where the Particulate Polymer is Prepared from Urea and 1,6-Hexanediamine Without a Stabilizer Compound To a silanized glass reactor is added 150 parts of a continuous phase, a polyether polyol, Voranol TM 4702 (an ethylene oxide/propylene oxide adduct of glycerine, equivalent weight about 16010 and primary hydroxyl content of 82 percent; sold by The Dow Chemical Company). The reactor is purged with nitrogen and the mixture is heated to about 150° C. Urea (6.37 parts) and 1,6-hexanediamine (12.40 parts) are ground together and well mixed in a jar in a nitrogen environment. Incriments (approximately 2.7 parts) of the urea/1,6-hexanediamine mixture are added to the reactor over a total time of 5 hours. The contents of the reactor are stirred until titrometric analysis shows no change in amine concentration.

The resulting particulate polymer (polyurea) in the continuous phase is then treated with a further 1.15 parts of urea, and stirred for about 16 hours at about 150° C. before purging the headspace of the reactor with nitrogen to remove any non-polymerized staring material and/or volatile products.

After purging, the particulate polymer and continuous phase are treated with 0.7 parts of benzol chloride, to give a finished product. On cooling, the finished product is a stable particulate polyurea dispersion which has a viscosity of about 2500 cps at 25° C., particulate polymer content of about 9.5 percent by weight, with particle size ranges of about 1 to 30 microns. SEM indicates that the particulates are spiral fiber bundles.

EXAMPLE 21

A Particulate Polymer Composition Wherein the Particulate Polymer is Prepared from 1,3-Diethylurea and Hexamethylene-1,6-diamine To a reactor is added 100 parts of a continuous phase, a polyether polyol, VORANOL TM 4702 (an ethylene oxide/propylene oxide adduct of glycerine, equivalent weight about 1610 and primary hydroxyl content of 82 percent; sold by The Dow Chemical Company), 0.16 part of urea, 0.16 part of hexamethylene-1,6-diamine, and 2.0 parts of an aminated polyether polyol (an ethylene oxide/propylene oxide adduct of glycerine, hydroxyl equivalent weight about 1610 and primary hydroxyl content of 82 percent which has been aminated so that 30.6 percent of its hydroxyl groups is converted to amine moieties). The reactor is purged with nitrogen and the mixture is heated from about 140° C. to about 150° C. for 18 to about 26 hours while continuously stirring. The resulting intermediate product is a turbid gray liquid.

To the intermediate product in the reactor is added further 8.21 parts of 1,3-diethylurea and 8.17 parts of hexamethylene-1,6-diamine. The urea and diamine are added to the reactor periodically, about every 45 minutes, in portions of about 1.8 parts while continuously stirring and maintaining the temperature at about 140° C. to about 150° C. The contents of the reactor are stirred continuously until titrometric analysis shows that the amine concentration is constant, in this case about 33 hours. The resulting particulate polymer (polyurea) in the continuous phase is then treated with a further 1.23 parts of 1,3-diethylurea, and stirred for about 23 hours at about 140° C. to 150° C. before purging the headspace with nitrogen to remove any non-polymerized starting materials and/or volatile products.

On cooling, the finished product is a stable particulate polyurea dispersion which has a viscosity of about 2900 cps at 25° C. The particulate polymer content is about 9.1 percent, with particle sizes ranging from about 0.1 to about 25 microns.

EXAMPLE 22

Use of a Particulate Polymer Composition to Prepare Flexible Polyurethane Foams

A series of polyurea dispersions based on urea, 1,6-hexanediamine, and an aminated polyether polyol (an ethylene oxide/propylene oxide adduct of glycerine, hydroxyl equivalent weight about 1610 and primary hydroxyl content of 82 percent which has been partially aminated so that 30.6 percent of its hydroxyl groups are converted to amine moieties) are prepared in a continuous phase, a polyether polyol, Voranol TM 4702 (an ethylene oxide/propylene oxide adduct of glycerine, equivalent weight about 1610 and primary hydroxyl content of 82 percent; sold by The Dow Chemical Company) using a procedure similar to that in Example 1. The samples are combined and blended to a single batch of polyurea dispersion which has a viscosity of about 2280 cps at 25° C., a particulate polymer content of about 10 percent by weight, with particle size ranges of about 1 to 10 microns. SEM indicates that the particles are spiral fiber bundles.

Flexible foams are prepared in a box molder using the following formulation:
 50 parts V-4703C[1]
 50 parts polyurea dispersion of Example 24
 3.5 parts water
 1.5 parts diethanolamine
 0.45 parts DABCO 33-LV[2]
 0.15 parts NIAX A-1[3]
 1.2 parts DC-5043[4]
 46.2 parts Voranate T-80[5]
  NCO/OH=1.00
  TDI/polyol=0.431
  Foam Weight=690 g

[1] A 5000 molecular weight ethylene oxide (20% cap)/proplyene oxide adduct of glycerine manufactured by The Dow Chemical Company.
[2] Triethylenediamine catalyst manufactured by Air Products.
[3] A catalyst manufactured by Union Carbide Corporation.
[4] Surfactant sold by Dow Corning.
[5] Toluenediisocynate manufactured by The Dow Chemical Company.

The polyol components are charged to a s.s. Beaker in the proportions described above and mixed at 1750 rpm with a pin mixer for 20 seconds to insure homogeneity. Voranate T-80 is added and mixed at 3300 rpm for 2.5 seconds. The material is then charged to a 15"×15"×4.5" aluminum box mold treated with De-lift-14 mold release (Cramer Chemical Company). The initial mold temperature is −60° C. Two minutes after the Vorante T-80 addition, the mold is charged to a 107° C. oven. It is left in the oven for four minutes, then removed and demolded.

The foam pads are crushed by hand to open the cells. The foams are opaque, light yellow and non-tacky.

A second set of flexible foams are prepared in a box molder using the following formulation (10 wt percent particulate polymer in the polyol):
 100 parts polyurea dispersion of Example 22
 3.5 parts water
 1.5 parts diethanolamine
 0.50 parts DABCO 33-LV
 0.17 parts NIAX A-1
 1.5 parts DC-5043
 46.2 parts Voranate T-80

Foams are prepared by the same procedure described above. The foam pads are crushed by hand to open the cells. The foams are opaque, light yellow and non-tacky.

EXAMPLE 23

Physical Properties of Polyurethane Flexible Foams

The physical properties of the polyurethane flexible foams of this invention are compared to foams where the particulate particles of this invention are replaced with commercial SAN copolymer polyol particles. Results are tabulated in Table IV.

The load bearing properties are increased significantly (improved) by using the particulate particles of this invention at the 5 percent loading level. Modulus approaches 3.0 at 10 percent loading using the particulate particles of this invention. The optimum comfort level in automotive sealings is obtained at a modulus of 3.0. Tear properties are increased significantly (improved) by using the particulate particles of this invention at 5 percent loading level. Both the compression set and the humid age compression set decrease (improve) by the use of the particulate particles of this invention at both the 5 and 10 percent loading level.

The improvements attained by using particulate particles of this invention are a consequence of its novel chemical composition and its aspect ratio (about 10).

TABLE IV

PHYSICAL PROPERTIES OF POLYURETHANE FLEXIBLE FOAMS

|  | Polyurea Dispersion of this Invention | | |
|---|---|---|---|
| % Solids | 5 | 5 | 10 |
| Pad wt (g) | 548 | 556 | 610 |
| Density (kglm3) | 29.8 | 30.7 | 30.7 |
| LOAD BEARING | | | |
| 25% IFD | 103 | 103 | 131 |
| 50% IFD | 188 | 185 | 242 |
| 65% IFD | 286 | 286 | 386 |
| Hysteresis (%) | 78.3 | 77.2 | 75.0 |
| Modulus | 2.78 | 2.77 | 2.95 |
| TENSILE/TEAR | | | |
| Tear (N/m) | 306 | 340 | 307 |
| Tensile (kPa) | 150 | 150 | 137 |
| Elongation (%) | 208 | 206 | 159 |
| COMPRESSION SET | | | |
| CSd 50% (%) | 14.5 | 13.2 | 9.4 |
| HACSd 50% (%) | 10.5 | 11.4 | 8.8 |
| FLAMMABILITY | | | |
| TM-32-12 | DNI | DNI | DNI |

IFD = Identification force deflection
CSd 50% = Compression set at 50% compression
HACSd 50% = Humid Age Compression set at 50% compression
TM-32-12 = Standard General Motors flammability test
DNI = Did not ignite

EXAMPLE 24

Particulate Polymer Dispersion Synthesis

A 1-liter glass resin kettle is equipped with an overhead stirrer, condenser (connected to an aqueous scrubber), heater, thermocouple, temperature controller, solids addition port, and a nitrogen bubbler. The stirrer consisted of a 76 mm, 4-blade paddle on the bottom and a 62 mm turbine blade just below the surface of the liquid. To the reactor (under a nitrogen pad) was charged 108.6 g of stabilizer concentrate (based on Jeffamine TM M-2005, urea, and 1,6-hexanediamine; 2.9 weight percent stabilizer) in Voranol TM 4702 and 771.8 g additional Voranol TM 4702. The reactor was heated to 150° C. using a stirring rate of 800 rpm. Urea and 1,6-hexanediamine (24.85 g and 47.32 g, respectively; a 1:1 molar ratio) are ground and mixed in a nitrogen atmosphere and placed in a bottle. The stir rate was increased to 1200 rpm. Approximately ⅛ of the monomer blend was added to the reactor every 45 minutes. After all of the monomers are added, the reactor was heated overnight at 150° C. A sample (dispersed in methanol) was titrated with 0.1N HCl and indicated 90% amine conversion. Additional urea (1.80 g) is added and heating is continued for 2 hours (98% amine conversion by titration). Vacuum is applied for 2 hours to remove residual ammonia and complete the amine conversion. The particulate polymer dispersion is filtered through 80 mesh screen to remove any large particles. The dispersion viscosity is 2396 cps at 25° C. as measured on a Haake Rotovisco 20 viscometer using an MV1 cup and bob measuring system.

EXAMPLE 25

10 g Melamine/100 g Particulate Polymer Dispersion

The particulate polymer dispersion prepared in Example 24 (100 g) is placed in a blender. Melamine (10 g) is added and blended for 2 minutes at low speed. The smooth dispersion is bottled. There is no apparent settling of the dispersion after 5 days at ambient temperature. The dispersion is shaken by hand and the viscosity is 1600 cps at 25° C. using the same procedure given in Example 24. The melamine loaded dispersion is stable/redispersible and has a lower viscosity than the starting particulate polymer dispersion.

EXAMPLE 26

10 g Melamine/100 g Particulate Polymer Dispersion

Another batch of particulate polymer dispersion is prepared by the same procedure given in Example 24 (viscosity: 2150 cps at 25° C.). A portion of this dispersion (100 g) is placed in a blender. Melamine (10 g; screened through 80 mesh) is added and blended for 2 minutes at low speed. The resultant smooth dispersion is bottled. There is slow settling of the dispersion after several days at ambient temperature. The dispersion is shaken by hand (readily redispersible) and the viscosity is determined to be 1980 cps at 25° C. using the same procedure given in Example 24. Scanning Electron Microscopy (SEM) indicated that the particulate polymer particles retained their fiber bundle morphology. The melamine loaded dispersion is duplicated and the stable/redispersible dispersion has a lower viscosity than the starting particulate polymer dispersion.

Example 27

20 g Melamine/100 g Particulate Polymer Dispersion

The particulate polymer dispersion used in Example 26 (100 g) is placed in a blender. Melamine (20 g; screened through 80 mesh) is added and blended for 2 minutes at low speed. The resultant smooth dispersion is bottled. There is slow settling of the dispersion after several days at ambient temperature. The dispersion is shaken by hand (readily redispersible) and the viscosity is determined to be 2340 cps at 25° C. using the same procedure given in Example 24.

EXAMPLE 28

30 g Melamine/100 g Particulate Polymer Dispersion

The particulate polymer dispersion used in Example 26 (100 g) is placed in a blender. Melamine (30 g; screened through 80 mesh) is added and blended for 2 minutes at low speed. The resultant smooth dispersion is bottled. There is slow settling of the dispersion after several days at ambient temperature. The dispersion is shaken by hand (readily redispersible) and the viscosity is determined to be 2740 cps at 25° C. using the same procedure given in Example 24.

EXAMPLE 29

40 g Melamine/100 g Particulate Polymer Dispersion

The particulate polymer dispersion used in Example 26 (100 g) is placed in a blender. Melamine (40 g; screened through 80 mesh) is added and blended for 2 minutes at low speed. The resultant smooth dispersion is bottled. There is slow settling of the dispersion after several days at ambient temperature. The dispersion is shaken by hand (readily redispersible) and the viscosity is determined to be 3370 cps at 25° C. using the same procedure given in Example 24. Scanning Electron Microscopy (SEM) indicated that the particulate polymer particles retained their fiber bundle morphology.

EXAMPLE 30

50 g Melamine/100 g Particulate Polymer Dispersion

The particulate polymer dispersion used in Example 26 (100 g) is placed in a blender. Melamine (50 g; screened through 80 mesh) is added and blended for 2 minutes at low speed. The resultant smooth dispersion is bottled. There is slow settling of the dispersion after several days at ambient temperature. The dispersion is shaken by hand (readily redispersible) and the viscosity is determined to be 3890 cps at 25° C. using the same procedure given in Example 24.

EXAMPLE 31

10 g Biuret/100 g Particulate Polymer Dispersion

The particulate polymer dispersion used in Example 26 (100 g) is placed in a blender. Biuret (10 g; screened through 80 mesh) is added and blended for 2 minutes at low speed. The resultant smooth dispersion is bottled. The viscosity is determined to be 2206 cps at 25° C. (about 4 hours after dispersion preparation) using the same procedure given in Example 24. The material is still a smooth dispersion six hours after its preparation. However after setting overnight at ambient temperature, the dispersion set up and is not redispersible.

COMPARATIVE EXAMPLE 1

Preparation of a Polyurethane Elastomer Based on Voranol TM 4702, Isonate TM 143LM, and 1,4-Butanediol. (not an example of the invention)

The monomers are degassed under a 0.5 mm vacuum prior to use. A disposable plastic beaker is charged with 70.40 g (0.0427 equivalents) of Voranol TM 4702, 24.45 g (0.1686 equivalents) Isonate TM 143LM, 5.48 g (0.1216 equivalents) of 1,4-butanediol, and 0.2 g of a 5% solution of dibutyltin dilaurate catalyst in Voranol 2120 (a poly(propylenoxy) polyol with a molecular weight of about 2000 available from The Dow Chemical Company). The contents of the beaker are mixed with a mechanical mixer for about one minute. The contents of the beaker are then poured into a 4"×4"×0.125" steel window mold lined with Mylar sheets (plastic sheets which serve as a mold release) and sprayed with a teflon mold release agent. The mold is closed and placed in a 150° C., air atmosphere oven for two hours. The mold is then cooled to ambient temperature before being opened. The amount of 1,4-butanediol added is calculated to give a hard segment concentration of 30 weight percent. The Index (ratio of isocyanate groups to hydroxyl and/or amine groups) is 1.03.

After being removed from the moldy the plaque is "aged" at ambient temperature and humidity for two weeks before being cut apart for testing. Test results are given below.

EXAMPLE 32

Preparation of a Particulate Polymer Dispersion Based Polyurethane Elastomer The procedure described in Comparative Example 24 is followed with the following exception: The Voranol TM 4702 is replaced with a particulate polymer dispersion based on 1,6-hexanediamine and a Jeffamine TM M2005-based stabilizer precursor similar to that prepared in Example 24. The dispersion of urea terminated poly(1,6-hexamethyleneurea) in Voranol TM 4702 is synthesized at 175° C. A polyurethane elastomer is prepared from 69.50 g (0.0373 equivalents) of the particulate polymer dispersion, 24.34 g (0.1679 equivalents) of Isonate TM 143LM, 5.62 g (0.1247 equivalents) of 1,4-butanediol, and 0.10 g of dibutyltin dilaurate solution. The amount of 1,4-butanediol added is calculated to give a hard segment concentration of 30 weight percent. The Index (ratio of isocyanate groups to hydroxyl and/or amine groups) is 1.03.

After being removed from the mold, the plaque is "aged" at ambient temperature and humidity for two weeks before being cut apart for testing. Test results are given below.

EXAMPLE 33

Preparation of a Melamine Loaded, Particulate Polymer Dispersion Based Polyurethane Elastomer (10 g melamine/100 g dispersion)

The procedure described in Example 32 is used to prepare the dispersion. The elastomer is prepared from 69.78 g (0.0334 equivalents) of melamine loaded, particulate polymer dispersion, prepared in Example 26, 24.21 g (0.1670 equivalents) of Isonate TM 143LM, 5.79 g (0.1285 equivalents) of 1,4-butanediol, and 0.06 g of dibutyltin dilaurate catalyst solution. The amount of 1,4-butanediol added is calculated to give a hard segment concentration of 30 weight percent. The Index (ratio of isocyanate groups to hydroxyl and/or amine groups) is 1.03.

After being removed from the mold, the plaque is "aged" at ambient temperature and humidity for two weeks before being cut apart for testing. Test results are given below.

EXAMPLE 34

Preparation of a Melamine Loaded, Particulate Polymer Dispersion Based Polyurethane Elastomer (20 g melamine/100 g dispersion)

The procedure described in Example 32 is used to prepare the dispersion. The elastomer is prepared from 70.50 g (0.0315 equivalents) of melamine loaded, particulate polymer dispersion prepared in Example 27, 24.13 g (0.1664 equivalents) of Isonate TM 143LM, 5.87 g (0.1303 equivalents) of 1,4-butanediol, and 0.06 g of dibutyltin dilaurate catalyst solution. The amount of 1,4-butanediol added is calculated to give a hard segment concentration of 30 weight percent. The Index (ratio of isocyanate groups to hydroxyl and/or amine groups) is 1.03.

After being removed from the mold, the plaque is "aged" at ambient temperature and humidity for two weeks before being cut apart for testing. Test results are given below.

EXAMPLE 35

Preparation of a Melamine Loaded, Particulate Polymer Dispersion Based Polyurethane Elastomer (30 g melamine/100 g dispersion)

The procedure described in Example 32 is used to prepare the dispersion. The elastomer is prepared from 70.50 g (0.0289 equivalents) of melamine loaded, particulate polymer dispersion prepared in Example 28, 24.02 g (0.1657 equivalents) of Isonate ™ M143LM, 5.95 g (0.1320 equivalents) of 1,4-butanediol, and 0.06 g of dibutyltin dilaurate catalyst solution. The amount of 1,4-butanediol added is calculated to give a hard segment concentration of 30 weight percent. The Index (ratio of isocyanate groups to hydroxyl and/or amine groups) is 1.03.

After being removed from the mold, the plaque is "aged" at ambient temperature and humidity for two weeks before being cut apart for testing. Test results are given below.

EXAMPLE 36

Preparation of a Melamine Loaded, Particulate Polymer Dispersion Based Polyurethane Elastomer (40 g melamine/100 g dispersion)

The procedure described in Example 32 is used to prepare the dispersion. The elastomer is prepared from 70.13 g (0.0372 equivalents) of melamine loaded, particulate polymer dispersion prepared in Example 29, 24.36 g (0.1680 equivalents) of Isonate ™ 143LM, 5.66 g (0.1256 equivalents) of 1,4-butanediol, and 0.09 g of dibutyltin dilaurate catalyst solution. The amount of 1,4-butanediol added is calculated to give a hard segment concentration of 30 weight percent. The Index (ratio of isocyanate groups to hydroxyl and/or amine groups) is 1.03.

After being removed from the mold, the plaque is "aged" at ambient temperature and humidity for two weeks before being cut apart for testing. Test results are given below.

EXAMPLE 37

Preparation of an Isocyanate Functional Prepolymer Comprised of a Melamine Loaded, Particulate Polymer Dispersion and Isonate ™ 125M A silanized, 100 ml resin kettle with a four necked top is equipped with a thermometer, mechanical stirrer, vacuum inlet and a pressure equalizing addition funnel capped with a rubber septum. The kettle is charged with 39.28 g (0.3139 equivalents) of Isonate ™ 125M and heated to 60° C. in an oil bath. The kettle is then placed under vacuum and the stirrer is started. The addition funnel is then charged with 51.84 g (0.0260 equivalents) of melamine (10 micron diameter) loaded, at 10 g melamine/100 g dispersion, particulate polymer dispersion. The dispersion is then dripped into the kettle over a 90 minute period with stirring, heat and vacuum being maintained. The kettle is then charged with 0.05 g of a 5 wt. % dibutyltin dilaurate catalyst solution and the reaction is allowed to proceed for four hours, before being cooled to 30° C.

EXAMPLE 38

Preparation of a Polymer Based on 1,4-butanediol and the Prepolymer made in Example 37

The reaction setup and equipment are used that are used in Example 37. 12.56 g (0.2787 equivalents) of 1,4-butanediol is added to the prepolymer through the septum via a syringe. The mixture is then stirred vigorously under vacuum for approximately 30 seconds. The vacuum is then broken the contents of the kettle are poured into a 4"×4"×0.125" steel window mold lined with Mylar sheets. The mold is then closed and placed in an oven at 150° C. for two hours. The oven is then allowed to free cool to ambient temperature before the mold is removed and opened. The amount of 1,4-butanediol added is calculated to give a hard segment concentration of 50 weight percent. The Index (ratio of isocyanate groups to hydroxyl and/or amine groups) is 1.03.

After being removed from the mold the plaque is cut apart for testing. Test results are given hereinbelow.

Property Evaluations

In Table 1, it can be seen that the flexural storage modulus at 25° C. increases significantly when urea terminated poly(1,6-hexamethyleneurea) polymer particles are present in the polyol (Comp. Ex. 1. vs. Ex. 32.). There is a general increase in modulus as increasing amounts of melamine are dispersed in the particulate polymer dispersion (Ex. 33–36), leading to stiffer, more highly reinforced polymers. The C.L.T.E. decreases (improves) and the temperature to 5% wt. loss decreases with increasing melamine loading.

Table 2 shows that the presence of melamine gives polyurethane plaques with improved fire retardancy properties, as indicated by the increased time to maximum rate of heat release and the decreased curve slope. Table 3 shows that, in general, melamine loaded polyurethane plaques have improved stiffness, breaking stress, breaking strain, and energy to break values.

TABLE 1

| | Thermal Analysis Data | | |
|---|---|---|---|
| Example | E' @ 25° C. and 1.0 HZ* | C.L.T.E. (ppm/°C.) | 5% Wt. Loss Temp. (°C.) |
| Comp. Ex. 1 | 1825 | 230 | 307 |
| Example 32 | 3194 | 226 | 303 |
| Example 33 | 7267 | 235 | 280 |
| Example 34 | 5948 | 224 | 277 |
| Example 35 | 9691 | 203 | 271 |
| Example 36 | 14,567 | 192 | 270 |
| Example 38 | 44,706 | 183 | 281 |

*E' = flexural storage modulus

TABLE 2

| | Flame Retardancy Data | | |
|---|---|---|---|
| Example | M.R.H.R.* (btu/sq. ft. min.) | Time Until M.R.H.R. (sec.) | Slope @ M.R.H.R. (btu/sq. ft.) |
| Comp. Ex. 1 | 1678 | 207 | 486 |
| Example. 32 | 1974 | 210 | 564 |
| Example 36 | 1752 | 283 | 371 |

*M.H.H.R.= Maximum Rate of Heat Release

TABLE 3

| | Tensile Data* | | | |
|---|---|---|---|---|
| Example | Strain @ Break (%) | Modulus (psi) | Energy to Break (in-lbs) | Stress @ Break (psi) |
| Comp. Ex. 1 | 115.6 | 1315 | 3.34 | 598 |
| Example. 9 | 201.0 | 2067 | 11.68 | 1200 |
| Example 10 | 213.4 | 3348 | 18.27 | 1444 |
| Example 11 | 169.1 | 3631 | 10.03 | 1153 |
| Example 12 | 190.3 | 5515 | 14.48 | 1339 |
| Example 13 | 194.1 | 6995 | 15.93 | 1421 |

*micro-tensile bars, avg. of four

EXAMPLE 39

Preparation of a Spectrim TM Loaded, Particulate Polymer Dispersion Based Polyurethane Elastomer (10 g Spectrim/100 g dispersion)

The procedure described in Example 32 is used with the following exception: The particulate polymer dispersion is modified by the addition of ground up Spectrim TM polymer at a concentration of 10 g of spectrim/100 g of dispersion. The elastomer is prepared from 70.00 g (0.0353 equivalents) of Spectrim TM loaded, particulate polymer dispersion, 24.28 g (0.1674 equivalents) of Isonate TM 143LM, 5.72 g (0.1269 equivalents) of 1,4-butanediol, and 0.06 g of dibutyltin dilaurate catalyst solution. The amount of 1,4-butanediol added is calculated to give a hard segment concentration of 30 weight percent. The Index (ratio of isocyanate groups to hydroxyl and/or amine groups) is 1.03.

After being removed from the mold, the plaque is "aged" at ambient temperature and humidity for two weeks before being cut apart for testing. Test results are given below.

EXAMPLE 40

Preparation of a Spectrim TM Loaded, Particulate Polymer Dispersion Based Polyurethane Elastomer (20 g Spectrim TM /100 g dispersion)

The procedure described in Example 32 is used with the following exception: The particulate polymer dispersion is modified by the addition of ground up Spectrim at a concentration of 20 g of Spectrim/100 g of dispersion. The elastomer is prepared from 70.50 g (0.0315 equivalents) of Spectrim TM loaded, particulate polymer dispersion, 24.13 g (0.1664 equivalents) of Isonate TM 143LM, 5.87 g (0.1303 equivalents) of 1,4-butanediol, and 0.06 g of dibutyltin dilaurate catalyst solution. The amount of 1,4-butanediol added is calculated to give a hard segment concentration of 30 weight percent. The Index (ratio of isocyanate groups to hydroxyl and/or amine groups) is 1.03.

After being removed from the mold, the plaque is "aged" at ambient temperature and humidity for two weeks before being cut apart for testing. Test results are given below.

EXAMPLE 41

Preparation of an Isocyanate Functional Prepolymer Comprised of a Spectrim TM Loaded, Particulate Polymer Dispersion and Isonate TM 143LM A silanized, 100 ml resin kettle with a four necked top is equipped with a thermometer, mechanical stirrer, vacuum inlet and a pressure equalizing addition funnel capped with a rubber septum. The kettle is charged with 39.27 g (0.2708 equivalents) of Isonate TM 143LM and heated to 60° C. in an oil bath. The kettle is then placed under vacuum and the stirrer is started. The addition funnel is then charged with 50.00 g (0.0247 equivalents) of Spectrim TM (250 micron diameter) loaded, at 10 g Spectrim TM /100 g dispersion, particulate polymer dispersion. The dispersion is then dripped into the kettle over a 60 minute period with stirring, heat and vacuum being maintained. Mixing is allowed to continue under vacuum for an additional two hours.

EXAMPLE 42

Preparation of a Polymer Based on 1,4-butanediol and the Prepolymer made in Example 41

70 g (0.1929 equivalents) of the isocyanate functional prepolymer prepared in Example 41 are poured into a plastic beaker. 8.44 g (0.1873 equivalents) of 1,4-butanediol are added to the beaker. The contents of the beaker are mechanically stirred for 30 seconds and then poured into a 4"×4"×0.125" steel window mold lined with Mylar sheets. The mold is then closed and placed in an oven at 150° C. for two hours. The mold is removed and opened. The amount of 1,4-butanediol added is calculated to give a hard segment concentration of 50 weight percent. The Index (ratio of isocyanate groups to hydroxyl and/or amine groups) is 1.03.

After being removed from the mold the plaque is cut apart for testing. Test results are given hereinbelow.

Property Evaluations

In Table 1, it can be seen that the flexural storage modulus at 25° C. increases significantly when urea terminated poly(1,6-hexamethyleneurea) polymer particles are present in the polyol (Comp. Ex. 1 vs Ex. 32). There is a general increase in modulus as increasing amounts of Spectrim TM are dispersed in the particulate polymer dispersion, leading to stiffer, more highly reinforced polymers. Table 2 shows that, general, Spectrim loaded polyurethane plaques have improved stiffness, breaking stress, breaking strain, and energy to break values.

This method of recycling scrap polyurethane/urea material as a filler dramatically improves the modulus, and tensile properties of the modified elastomers.

TABLE 1

| | Thermal Analysis Data | | |
|---|---|---|---|
| Example | E' @ 25° C. and 1.0 Hz* (psi) | C.L.T.E. (ppm/°C.) | 5% Wt. Loss Temp. (°C.) |
| Comp. Ex. 1 | 1825 | 230 | 307 |
| Example 32 | 3194 | 226 | 303 |
| Example 39 | 6315 | 244 | 304 |
| Example 40 | 11,101 | 214 | 305 |
| Example 41 | 64.918 | 170 | 295 |

*E' = flexural storage modulus

TABLE 2

| | Tensile Data* | | | |
|---|---|---|---|---|
| Example | Strain @ Break (%) | Modulus (psi) | Energy to Break (in-lbs) | Stress @ Break (psi) |
| Comp. Ex. 1 | 115.6 | 1315 | 3.34 | 598 |
| Example 32 | 201.0 | 2067 | 11.68 | 1200 |
| Example 39 | 155.0 | 3785 | 15.38 | 1605 |
| Example 40 | 188.0 | 5732 | 23.66 | 1974 |

*micro-tensile bars, avg. of four

EXAMPLE 43

Preparation of a Melamine Dispersion in Voranol TM 4703 (10 g melamine/100 g Voranol TM 4703)

a) A concentrated solution of stabilizing agent is prepared by combining Voranol TM 4702 (668.4 g), urea (21.1 g, 0.351 moles), 1,6-hexanediamine (32.4 g, 0.279 moles) and Jeffamine TM M-2005 (152 g, 0.0676 moles) in a 1000 ml reaction kettle and by heating to a temperature of 150° C. while stirring at a rate of 700 rpm under a nitrogen atmosphere for 21 hours. The concentrated stabilizing agent (108.0 grams; approximately 23.5% wt % surfactant) is diluted with 750.0 grams of the Voranol TM 4703 (a poly(propyleneoxy) triol capped with about 18 percent by weight ethyleneoxy groups, having a molecular weight of about 5000, available from The Dow Chemical Company) in a 1.0 liter blender container and mixed on high power for 1 minute and then for 1 minute on low power to give a 3.4 wt % surfactant solution. The viscosity is measured on a Haake Rotovisco 20 viscometer using a MV1 sensor. The sensor is accelerated from rest to 100 s$^{-1}$ over a two minute time period and then from 100 s$^{-1}$ to rest over two more minutes. The reported viscosity is the average of the viscosity for the up ramp and the down ramp. The viscosity for the surfactant is 900 centipoise (cps).

b) A dispersion is prepared by combining melamine (20 grams of 10 μm diameter) and 200 grams of the surfactant solution in a 500 ml blender container and by mixing on low power for 2 minutes. The viscosity of the resultant dispersion is 1130 cps at 25° C. The melamine dispersion is stable for about 4 days and is readily redispersible.

EXAMPLE 44

Preparation of a Melamine Dispersion in Voranol TM 4703 (20 g melamine/100 g Voranol TM 4703)

A dispersion is prepared by combining melamine (40 grams of 10 μm diameter) and 200 grams of the surfactant solution prepared in Example 43 in a 500 ml blender container and by mixing on low power for 2 minutes. The viscosity of the resultant dispersion is 1320 cps at 25° C. The melamine dispersion is stable for about 4 days and is readily redispersible.

EXAMPLE 45

Preparation of a Melamine Dispersion in Voranol TM 4703 (30 g melamine/100 g Voranol TM 4703)

A dispersion is prepared by combining melamine (60 grams of 10 μm diameter) and 200 grams of the surfactant solution prepared in Example 43 in a 500 ml blender container and by mixing on low power for 2 minutes. The viscosity of the resultant dispersion is 1720 cps at 25° C. The melamine dispersion is stable for about 4 days and is readily redispersible.

EXAMPLE 46

Preparation of a Melamine Dispersion in Voranol TM 4703 (40 g melamine/100 g Voranol TM 4703)

A dispersion is prepared by combining melamine (80 grams of 10 μm diameter) and 200 grams of the surfactant solution prepared in Example 43 in a 500 ml blender container and by mixing on low power for 2 minutes. The viscosity of the resultant dispersion is 2146 cps at 25° C. The melamine dispersion is stable for about 4 days and is readily redispersible.

EXAMPLE 47

Preparation of a Calcium Carbonate Dispersion in Voranol TM 4703 (10 g calcium carbonate/100 g Voranol TM 4703)

A dispersion is prepared by combining calcium carbonate (20 grams of 10 μm diameter) and 200 grams of the surfactant solution prepared in Example 43 in a 500 ml blender container and by mixing on low power for 2 minutes. The viscosity of the resultant dispersion is 976 cps at 25° C. The calcium carbonate dispersion is stable for about 4 hours and is readily redispersible.

EXAMPLE 48

Preparation of a Calcium Carbonate Dispersion in Voranol TM 4703 (30 g calcium carbonate/100 g Voranol TM 4703)

A dispersion is prepared by combining calcium carbonate (60 grams of 10 μm diameter) and 200 grams of the surfactant solution prepared in Example 43 into a 500 ml blender container and by mixing on low power for 2 minutes. The viscosity of the resultant dispersion is 1627 cps at 25° C. The calcium carbonate dispersion is stable for about 4 hours and is readily redispersible.

EXAMPLE 49

Preparation of a Ground Spectrim TM Dispersion in Voranol TM 4703 (10 g Spectrim TM /100 g Voranol TM 4703)

A dispersion is prepared by combining ground Spectrim (20 grams of ≦250 micron diameter; ground polyurethane/urea scrap) and 200 grams of the surfactant solution prepared in Example 43 in a 500 ml blender and by mixing on low power for 2 minutes. The viscosity of the resultant dispersion is 1325 cps at 25° C. The ground Spectrim TM dispersion is stable for about 3 days and is readily redispersible.

EXAMPLE 50

Preparation of a Ground Spectrim TM Dispersion in Voranol TM 4703 (20 g Spectrim/100 g Voranol TM 4703)

A dispersion is prepared by combining ground Spectrim TM (40 grams: ≦250 micron diameter) and 200 grams of the surfactant solution prepared in Example 43 in a 500 ml blender container and by mixing on low power for 2 minutes. The viscosity of the resultant dispersion is 2682 cps at 25° C. The spectrim dispersion is stable for about 3 days and is readily redispersible.

EXAMPLE 51

Preparation of a Ground Spectrim TM Dispersion in Voranol TM 4703 (40 g Spectrim TM /100 g Voranol TM 4703)

A dispersion is prepared by combining ground Spectrim TM (80 grams; ≦250 micron diameter) and 200 grams of the surfactant solution prepared in Example 43 in a 500 ml blender container and by mixing on low power for 2 minutes. The resultant dispersion is very thick and therefore a viscosity measurement is not possible.

EXAMPLE 52

Preparation of a Melamine Dispersion in Voranol TM 4703 (10 g melamine/ 100 g Voranol TM 4703)

a) A concentrated solution of stabilizing agent is prepared by combining Voranol TM 4702 (648.0 g), urea (16.84 g, 0.280 moles), 1,6-hexanediamine (17.63 g, 0.152 moles), and partially aminated Voranol (144.6 g, 0.0174 moles) in a 1000 ml reaction kettle and by heating to a temperature of 150° C., while stirring at 700 rpm under a nitrogen atmosphere for 21 hours. The concentrated stabilizing agent (105.0 grams; approximately 23.5% wt % stabilizing agent) is diluted with Voranol TM 4703 (750.0 grams) in a 1.0 liter blender container and mixed on high power for 1 minute and then for 1 minute on low power to give a 3.4 wt % surfactant solution. The viscosity is measured on a Haake Rotovisco 20 viscometer using a MV1 sensor. The sensor is accelerated from rest to 100 s$^{-1}$ over a two minute time period and then from 100 s$^{-1}$ to rest over two more minutes. The reported viscosity is the average of the viscosity for the up ramp and the down ramp. The viscosity for the surfactant is 937 centipoise (cps) at 25° C.

b) A dispersion is prepared by combining melamine (20 grams; 10 μm average diameter) and 200 grams of the surfactant solution in a 500 ml blender container and by mixing on low power for 2 minutes. The viscosity of the resultant dispersion is 1141 cps at 25 ° C. The melamine dispersion is stable for about 4 days and is readily redispersible.

EXAMPLE 53

Preparation of a Melamine Dispersion in Voranol ™ 4703 (20 g melamine/100 g Voranol ™ 4703)

A dispersion is prepared by combining melamine (40 grams; 10 μm average diameter) and 200 grams of the surfactant solution prepared in Example 52 in a 500 ml blender container and by mixing on low power for 2 minutes. The viscosity of the resultant dispersion is 1145 cps at 25° C. The melamine dispersion is stable for about 4 days and is readily redispersible.

EXAMPLE 54

Preparation of a Melamine Dispersion in Voranol ™ 4703 (30 g melamine/100 g Voranol ™ 4703)

A dispersion is prepared by combining melamine (60 grams; 10 μm average diameter) and 200 grams of the surfactant solution prepared in Example 52 in a 500 ml blender container and by mixing on low power for 2 minutes. The viscosity of the resultant dispersion is 1934 cps at 25° C. The melamine dispersion is stable for about 4 days and is readily redispersible.

EXAMPLE 55

Preparation of a Melamine Dispersion in Voranol 4703 ™ (40 g melamine/100 g Voranol ™ 4703)

A dispersion is prepared by combining melamine (80 grams; 10 μm average diameter) and 200 grams of the surfactant solution prepared in Example 52 in a 500 ml blender container and by mixing on low power for 2 minutes. The viscosity of the resultant dispersion is 2643 cps at 25° C. The melamine dispersion is stable for about 4 days and is readily redispersible.

As discussed above, polyols containing dispersions of particulate polymers as described above are useful in the preparation of polyurethane foams where they may provide enhanced FR (fire resistance) and mechanical properties (particularly load bearing, tear, and compression set improvements). However, the loading level of particulate polymer solids in these dispersions may be limited due to the aspect ratio of these particles. As loading with particulate polymers is increased (>15%), the viscosity of the polyol may increase above a range useful for foam fabrication. To further improve the FR and mechanical properties of the foam, it may be desirable to add melamine to the polyol. However, dispersions of melamine in polyols are generally unstable in the absence of a stabilizer.

It has been discovered that the dispersions of particulate polymers can be loaded with high levels of melamine to give novel compositions of matter, while maintaining useful viscosities. These melamine loaded dispersions utilize the surfactant already present in the particulate polymer dispersions for their stability. The melamine particles apparently do not agglomerate. They may separate slowly on standing (days) but are readily redispersible with mild agitation. These novel melamine-loaded particulate polymer dispersions produce enhanced FR and mechanical properties when used to prepare polyurethanes.

The stabilizer compounds used to stabilize dispersions of particulate polymers are also an effective stabilizing agent for melamine in these types of dispersions. These melamine loaded, particulate polymer dispersions may be incorporated into polyurethanes, such as hand cast polyurethane elastomer formulations or polyurethane foam formulations. Preferably, the melamine comprises at least about 2 weight percent, more preferably at least about 5 weight percent, most preferably at least about 10 weight percent, and preferably no greater than about 80 weight percent, more preferably no greater than about 60 weight percent, and most preferably no greater than about 40 weight percent, based on the total weight of the dispersion.

Polyurethane elastomers prepared from such dispersions advantageously show significant improvements in modulus, coefficient of linear thermal expansion, flame retardancy and tensile properties such as energy to break, and stress at break. Accordingly, novel polymers may be formed by the reaction of one or more polyols containing a dispersion of a particulate polymer, a stabilizer compound, and melamine, with one or more polyisocyanates, optionally in the presence of one or more other polyahls. In addition, isocyanate-functional prepolymers may be made by the reaction of one or more polyols containing a dispersion of a particulate polymer, a stabilizer compound, and melamine, with one or more polyisocyanates such that there is an excess of isocyanate moieties in the reaction mixture. Such isocyanate-functional prepolymers may be used in the preparation of novel polymers, by reaction with one or more polyahls.

It has also been discovered that ground polyurethane RIM, foams, and elastomers may be used as fillers in the particulate polymer dispersion of the invention, and that the thermal and physical properties of the polyurethanes elastomer prepared thereby may be improved with the use of such fillers. It has been discovered that the ground-up polyurethane forms a stable dispersion in a particulate polymer dispersion which contains a stabilizer compound as described above Such dispersions may be incorporated into a variety of polyurethane formulations, including hand cast polyurethane elastomer formulations. The resulting hand-cast elastomers show significant improvements in modulus, and tensile properties such as energy to break, and stress at break. A further benefit from the use of ground-up polyurethane as a filler is that it is a method to recycle such polyurethanes.

Preferably, the ground-up polyurethane particles comprise at least about 2 weight percent, more preferably at least about 5 weight percent, most preferably at least about 10 weight percent; and preferably no greater than about 80 weight percent, more preferably no greater than about 60 weight percent, and most preferably no greater than about 40 weight percent, based on the total weight of the dispersion. Preferably, the median size of the ground-up particles is at least about 0.2 micron, most preferably at least about 1 micron; and is preferably no greater than about 500 microns, and is most preferably no greater than about 250 microns. The examples which follow use Spectrim ™ polyurethane (the raw materials of which are available from The Dow Chemical Company) that has been ground up to 250 micron size flakes.

Accordingly, novel polymers may be formed by the reaction of one or more polyols containing a dispersion of a particulate polymer, a stabilizer compound, and a ground-up polyurethane, with one or more polyisocyanates, optionally in the presence of one or more polyahls. Isocyanate-functional prepolymers may be made by the reaction of one or more polyols containing a dispersion of a particulate polymer, a stabilizer compound, and a ground-up polyurethane, with one or more polyisocyanates such that there is an excess of isocyanate equivalents in the reaction mixture. In addition, such prepolymers may be used to prepare polyurethanes by reaction with one or more polyahls.

In addition, other types of fillers, including calcium carbonate, may be dispersed in a polyols containing a dispersion of a particulate polymer and a stabilizer compound. Polyurethane prepolymers and polymers may be prepared therefrom. Further, the stabilizer compounds may be used to prepare dispersions of fillers in polyols, in the absence of particulate polymer particles. Polyurethane prepolymers and polymers may be prepared therefrom.

What is claimed is:

1. A solid particulate polymer comprising
   a) a backbone containing
      (i) a plurality of moieties selected from the group consisting of alkylene, arylene, aralkylene, alkylarylene, cycloalkylene, alkyleneoxy, and polyalkyleneoxy;
      (ii) a plurality of moieties selected from the group consisting of internal urea, thiourea, biuret and dithiobiuret; and
   b) end groups selected from the group consisting of urea, thiourea, biuret and dithiobiuret.

2. The solid particulate polymer of claim 1 which comprises at least one internal urea moiety and at least one urea end group.

3. The solid particulate polymer of claim 1 which comprises at least one internal biuret moiety and at least one biuret end group.

4. The solid particulate polymer of claim 1 which comprises at least one $C_{4-12}$ alkylene, arylene, or polyether group.

5. The solid particulate polymer of claims 1 which has an average particle size of no greater than about 30 microns.

6. A polymeric stabilizer compound containing a plurality of aminocarbonyl and/or aminothiocarbonyl moieties which is the reaction product of
   (a) a partially aminated poly(alkylene glycol) and/or an aminated monoalkylene glycol;
   (b) one or more carbonyl- or thiocarbonyl-containing compounds selected from the group consisting of a urea compound, a biuret compound, a thiourea compound and a dithiobiuret compound; and
   (c) one or more polyamines, at an elevated temperature sufficient to cause the reaction between (a), (b), and (c) to form the stabilizer compound.

7. The polymeric stabilizer of claim 6 which corresponds to the following formula:

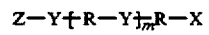

wherein X is $NH_2C(O)NH-$, $NH_2C(S)NH-$, $NH_2C(O)NHC(O)NH-$, or $NH_2C(S)NHC(S)NH-$; Y is independently in each occurrence $-NHC(O)NH-$, $-NHC(S)NH-$, $-NHC(O)NHC(O)NH-$, or $-NHC(S)NHC(S)NH-$;

Z is the residue of a partially aminated poly(alkylene glycol) and/or a fully aminated monoalkylene glycol after removal of a hydrogen atom from a terminal amine group; R is independently in each occurrence alkylene, arylene, aralkylene, alkylarylene, cycloalkylene, alkyleneoxy, or polyalkyleneoxy; and m is an integer from 1 to 20.

8. The polymeric stabilizer of claim 7 wherein X is $NH_2C(O)NH-$.

9. The polymeric stabilizer of claim 7 wherein X is $-NHC(O)NHC(O)NH-$.

10. The polymeric stabilizer of claim 7 wherein at least one Y is $-NH_2C(O)NH-$.

11. The polymeric stabilizer of claim 7 wherein at least one Y is $-NHC(O)NHC(O)NH-$.

12. A flexible polyurethane foam, characterized in that the foam is prepared in the presence of a stable dispersion of (b) in (a) which comprises
   (a) a continuous phase; and
   (b) from about 0.1 to about 50 weight percent by total weight of (a) and (b) of a discrete particulate polymer which has an average particle size of about 30 microns or less, characterized in that (b) is a product containing a plurality of moieties selected from the group consisting of internal urea, thiourea, biuret and dithiobiuret, which is the result of a reaction that comprises contacting
   (c) one or more carbonyl- or thiocarbonyl-containing compounds selected from the group consisting of urea compounds, biuret compounds, thiourea compounds, or dithiobiuret compounds; and
   (d) one or more polyamines.

13. The flexible polyurethane foam of claim 12 wherein the particulate polymer contains at least one internal urea moiety.

14. The flexible polyurethane foam of claim 12 wherein the particulate polymer contains at least one internal biuret moiety.

15. The flexible polyurethane foam of claim 12 wherein component (d) comprises at least one $C_{4-12}$ aliphatic diamine, aromatic diamine, or diaminated polyether polyol.

16. The flexible polyurethane foam of claim 12 wherein the continuous phase is a liquid.

17. The flexible polyurethane foam of claim 16 wherein the continuous phase comprises a polyether polyol, polyester polyol, polycarbonate polyol, or a mixture thereof.

18. The flexible polyurethane foam of claim 17 wherein the continuous phase comprises a polyether polyol with an equivalent weight in the range of from about 500 to about 2500 and from about 2 to about 8 isocyanate-reactive groups per molecule.

19. A stable dispersion of (b), (c), and (d) in (a) which comprises
   (a) a continuous phase;
   (b) from about 0.1 to about 15 percent by weight of a polymeric stabilizer compound containing a plurality of urea, thiourea, biuret, and/or dithiobiuret moieties which is the reaction product of
   (i) a partially aminated poly(alkylene glycol) and/or an aminated monoalkylene glycol;
   (ii) one or more carbonyl- or thiocarbonyl-containing compounds selected from the group consisting of a urea compound, a biuret compound, a thiourea compound and a dithiobiuret compound; and
   (iii) one or more polyamines, at an elevated temperature sufficient to cause the reaction between (i), (ii), and (iii) to form the stabilizer compound;
(c) from about 0.1 to about 50 percent by weight of a discrete particulate polymer which has an average particle size of about 30 microns or less, which contains a plurality of moieties selected from the group consisting of internal ureas thiourea, biuret and dithiobiuret, which the result of a reaction that comprises contacting
   (i) one or more carbonyl- or thiocarbonyl-containing compounds selected from the group consisting of urea compounds, biuret compounds, thiourea compounds, or dithiobiuret compounds; and
   (ii) one or more polyamines; and
(d) from about 2 to about 60 percent by weight melamine.

20. A polyurethane foam, plastic, or elastomer prepared by the reaction of the dispersion of claim 19 and at least one polyisocyanate.

21. A polyurethane prepolymer prepared by the reaction of the dispersion of claim 19 and an excess over stoichiometry of at least one polyisocyanate.

22. A stable dispersion of (b), (c), and (d) in (a) which comprises
   (a) a continuous phase;
   (b) from about 0.1 to about 15 percent by weight of a polymeric stabilizer compound containing a plurality of urea, thiourea, biuret, and/or dithiobiuret moieties which is the reaction product of
      (i) a partially aminated poly(alkylene glycol) and/or an aminated monoalkylene glycol;
      (ii) one or more carbonyl- or thiocarbonyl-containing compounds selected from the group consisting of a urea compound, a biuret compound, a thiourea compound and a dithiobiuret compound; and
      (iii) one or more polyamines, at an elevated temperature sufficient to cause the reaction between (i), (ii), and (iii) to form the stabilizer compound;
   (c) from about 0.1 to about 50 percent by weight of a discrete particulate polymer which has an average particle size of about 30 microns or less, which contains a plurality of moieties selected from the group consisting of internal urea, thiourea, biuret and dithiobiuret, which is the result of a reaction that comprises contacting
      (i) one or more carbonyl- or thiocarbonyl-containing compounds selected from the group consisting of urea compounds, biuret compounds, thiourea compounds, or dithiobiuret compounds; and
      (ii) one or more polyamines; and
   (d) from about 2 to about 60 percent by weight of a ground polyurethane with a median particle size of less than about 500 microns.

23. A polyurethane foamy plastic, or elastomer prepared by the reaction of the dispersion of claim 22 and at least one polyisocyanate.

24. A polyurethane prepolymer prepared by the reaction of the dispersion of claim 22 and an excess over stoichiometry of at least one polyisocyanate.

* * * * *